(12) United States Patent
Allu et al.

(10) Patent No.: US 11,915,442 B2
(45) Date of Patent: Feb. 27, 2024

(54) METHOD AND APPARATUS FOR ARBITRARY OUTPUT SHAPE PROCESSING OF AN IMAGE

(71) Applicant: TEXAS INSTRUMENTS INCORPORATED, Dallas, TX (US)

(72) Inventors: Rajasekhar Reddy Allu, Plano, TX (US); Niraj Nandan, Plano, TX (US); Mihir Narendra Mody, Bangalore (IN); Gang Hua, Katy, TX (US); Brian Okchon Chae, Johns Creek, GA (US); Shashank Dabral, Allen, TX (US); Hetul Sanghvi, Richardson, TX (US); Vikram VijayanBabu Appia, Dallas, TX (US); Sujith Shivalingappa, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 76 days.

(21) Appl. No.: 17/474,489

(22) Filed: Sep. 14, 2021

(65) Prior Publication Data

US 2021/0407120 A1    Dec. 30, 2021

Related U.S. Application Data

(60) Division of application No. 15/879,281, filed on Jan. 24, 2018, now Pat. No. 11,145,079, which is a
(Continued)

(51) Int. Cl.
*G06T 7/60* (2017.01)
*G06T 5/00* (2006.01)
(Continued)

(52) U.S. Cl.
CPC .............. *G06T 7/60* (2013.01); *G06T 5/006* (2013.01); *G06T 5/40* (2013.01); *G06T 7/11* (2017.01);
(Continued)

(58) Field of Classification Search
CPC .. G06T 7/60; G06T 5/006; G06T 5/40; G06T 7/11; G06T 2207/10024; G06T 2207/20021
See application file for complete search history.

(56) References Cited

U.S. PATENT DOCUMENTS 8,064,517 B1    11/2011    Viscito et al.
8,406,554 B1    3/2013    Saha et al.
(Continued)

OTHER PUBLICATIONS

Chen, et al., "Multi-Level Image Thresholding Bases on Histogram Holding," 2009, IEEE 2nd International Congress on Image and Signaling Processing, 5 pages.

*Primary Examiner* — John W Lee
(74) *Attorney, Agent, or Firm* — Brian D. Graham; Frank D. Cimino

(57) ABSTRACT

An apparatus and method for geometrically correcting an arbitrary shaped input frame and generating an undistorted output frame. The method includes capturing arbitrary shaped input images with multiple optical devices and processing the images, identifying redundant blocks and valid blocks in each of the images, allocating an output frame with an output frame size and dividing the output frame into regions shaped as a rectangle, programming the apparatus and disabling processing for invalid blocks in each of the regions, fetching data corresponding to each of the valid blocks and storing in an internal memory, interpolating data for each of the regions with stitching and composing the valid blocks for the output frame and displaying the output frame on a display module.

20 Claims, 15 Drawing Sheets

Related U.S. Application Data continuation-in-part of application No. 15/714,862, filed on Sep. 25, 2017, now abandoned.

(51) Int. Cl.
  *G06T 5/40* (2006.01)
  *G06T 7/11* (2017.01)

(52) U.S. Cl.
  CPC ............... *G06T 2207/10024* (2013.01); *G06T 2207/20021* (2013.01)

(56) References Cited

U.S. PATENT DOCUMENTS

| | | |
|---|---|---|
| 2002/0044691 A1 | 4/2002 | Matsugu |
| 2004/0008773 A1* | 1/2004 | Itokawa ........... G08B 13/19689 348/E7.086 |
| 2004/0027313 A1 | 2/2004 | Pate et al. |
| 2004/0027363 A1 | 2/2004 | Allen |
| 2005/0163371 A1 | 7/2005 | Nystrom et al. |
| 2006/0262137 A1* | 11/2006 | Lempp ................. G06F 3/1446 345/619 |
| 2014/0247871 A1 | 9/2014 | Merkle et al. |
| 2014/0341466 A1* | 11/2014 | Babacan ................ G06T 5/002 382/163 |
| 2015/0147005 A1 | 5/2015 | Lerner et al. |
| 2015/0264351 A1* | 9/2015 | Miyoshi ............... H04N 19/139 375/240.13 |
| 2018/0122078 A1* | 5/2018 | Polavarapu ............ G11B 27/10 |

\* cited by examiner

METHOD AND APPARATUS FOR ARBITRARY OUTPUT SHAPE PROCESSING OF AN IMAGE

CROSS-REFERENCE TO RELATED APPLICATIONS

This divisional application claims the benefit of U.S. patent application Ser. No. 15/879,281, filed Jan. 24, 20218, which claims the benefit of U.S. patent application Ser. No. 15/714,862, filed Sep. 25, 2017, the disclosure of each of these applications is fully incorporated herein by reference.

BACKGROUND OF THE INVENTION

Technical Field

The present invention relates to geometric correction engines and more specifically to correcting distorted images captured by lenses to generate an undistorted image.

Description of Related Art

Lens geometric distortion issues in a camera system are common. The distortion can be common optical distortions, such as barrel distortion, pin-cushion distortion, or fisheye distortion. A correction therefore is needed to correct these types of distortions in hardware in combination with software or firmware. Affine transformation support is added to support the image and video stabilization application, where multiple images of the same scene need to be aligned. Perspective warp is an extension to affine transform and offers additional capabilities. Perspective transformations can align two images that are captured from different camera viewpoints or locations. This can also be used to rectify the left and right images of a stereo camera to reduce the complexity of a disparity computation. Perspective transformations can also generate new viewpoints.

Most digital cameras suffer from some degree of non-linear geometric distortion. A spatial transformation is required to correct the distortion. In automotive and security applications, cameras use wide angle lenses, including fish-eye lenses to provide 180+° field of view. To visually present the scene to the user in an easy-to-consume representation, these distortions need to be corrected.

FIG. 1 (0100) generally illustrates a distorted image (0101) geometrically corrected with a geometric correction engine (0102) and displayed as an undistorted image (0103). One technique to correct a distorted image is forward mapping which gives coordinates of the original, undistorted image as a function of coordinates of the distorted image. Forward mapping maps the input pixels (distorted image) onto the output space (undistorted image). Using forward mapping, every output pixel may not correspond to a valid input location, so output pixels can be empty or contain many nearby mapped pixels requiring complex interpolation algorithms. Therefore, forward mapping is not suitable for correcting the distortion.

Another technique is back mapping which gives coordinates of the distorted image as a function of coordinates of the undistorted output image. Correction involves back-mapping each output pixel to a location in the source distorted image, and thus the corrected image is fully populated. As the distorted pixel locations mostly fall onto fractional coordinates, correction involves interpolation among the nearest available pixels.

FIG. 2 (0200) generally illustrates an output image (0202) back mapped to an input image (0201). The input image (0201) is blended with fetch blocks such as blocks (0203, 0204, 0223, 0233). The fetch blocks contain pixel information of input blocks. For any distortion, the user may determine the overlap between the distorted space and the input image coordinates. Valid image data is produced only for those points where the distorted space lies completely within the valid input image.

The output image is divided into output blocks containing pixel information of the output image, for example blocks (0213, 0214) contain information of parts of the mat in the output image. The output blocks have a fixed size with a constant width and a constant height. The width of the output block represents the number of pixels in the block arranged in a row. The height of the output block represents the number of lines in the block. In current back mapping system, each of the output blocks is back mapped into input blocks after a perspective transform and pixel interpolation. For example, output block (0214) is back mapped to input block (0204) representing a portion of the white colored border of the mat in the image (0202). Similarly, output block (0213) is back mapped to input sub blocks (0203, 0223, 0233) representing data corresponding to top right corner data from the center white square of the mat. With a fixed output block size, it is clear that certain output blocks require less information compared to other output blocks. In order to back map after perspective transform, output block (0214) required data from one input block (0204), while output block (0213) required data from 3 input sub blocks (0203, 0223, 0233). The input blocks required for an output block may be together or spread apart in the input image. The input fetch blocks are stored off chip generally in a DDR memory. When the input blocks are together, the DDR bus may accommodate fetching the required input blocks in one cycle. However, if the input blocks are spread apart, multiple cycles may be required to fetch the input block due to addressing constraints and bus width. Latency difference for fetching is different for different input blocks resulting in performance loss and poor utilization of bandwidth. Therefore, with a fixed output block size, some output blocks require less information to be fetched versus some others. The ratio of the size of the input block size to the size of the output blocks required for the output block may be defined as a magnification factor or scaling factor. The size of the output block size is determined by the largest magnification factor. In other words, the smaller the output block size the larger the amount of data required to be fetched into an internal memory. The internal memory is fixed in size and the data required to be fetched for a high magnification factor output block may require many cycles to fetch the data resulting in a high bandwidth use and loss of performance. Therefore, there is a need to program the size of the output block size based on the magnification factor so that the bandwidth and cycles for fetching the input block data into an internal memory is minimized resulting in an enhanced performance.

FIG. 3 (0300) illustrates a prior art input image captured by multiple cameras and stitched into an output image. An output image (0310) is composed and stitched from multiple input images (0301, 0302, 0303, 0304) captured from different angles by different cameras. The cameras may be dash mounted on the front left, front right, rear left, and rear right corners of an automobile. In FIG. 3, the cameras are mounted on front, back, left and right. The images thus captured are stitched into an output image. However, the multiple images captured from different viewpoints contain redundant information. For example, the region (0314) captured by a central camera is also captured in the region (0313) by a right camera and captured in the region (0315) by a left camera. The redundant regions are double processed for stitching and processing the same image. There is considerable loss of performance due to cycles spent in fetching and processing the redundant blocks. Therefore, there is a need to identify and skip the processing of the redundant blocks.

FIG. 4 (0400) illustrates a prior art geometric correction block diagram of an input frame buffer to generate an output frame buffer through back mapping and mesh data. An output frame buffer (0402) is mapped to an input frame buffer (0401) after each of the output blocks (0403) in the output frame buffer (0402) undergoes a perspective transformation and mesh warping through a geometric correction engine (0404) to generate an input block (0405). The output of the perspective warp may be an intermediate block (0406) corresponding to the four corners of the output block (0403). A mesh table (0407) that maintains the information corresponding to the output block or the intermediate block may further be used to map the intermediate block to the four corners of an input block (0405). The prior art output block has a fixed size and therefore all the pixel data mapped to the input blocks which can contain unused data needs to be fetched together. Therefore, there is a need for a method to customize the output block size based on the scaling factor.

SUMMARY OF THE INVENTION

The present invention is an apparatus and method for geometrically correcting an arbitrary shaped input frame and generating an undistorted output frame. The method includes capturing arbitrary shaped input images with multiple optical devices and processing the images, identifying redundant blocks and valid blocks in each of the images, allocating an output frame with an output frame size and dividing the output frame into regions shaped as a rectangle, programming the apparatus and disabling processing for invalid blocks in each of the regions, fetching data corresponding to each of the valid blocks and storing in an internal memory and interpolating data for each of the regions with stitching and composing the valid blocks for the output frame and displaying the output frame on a display module.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE INVENTION

Figure 1:
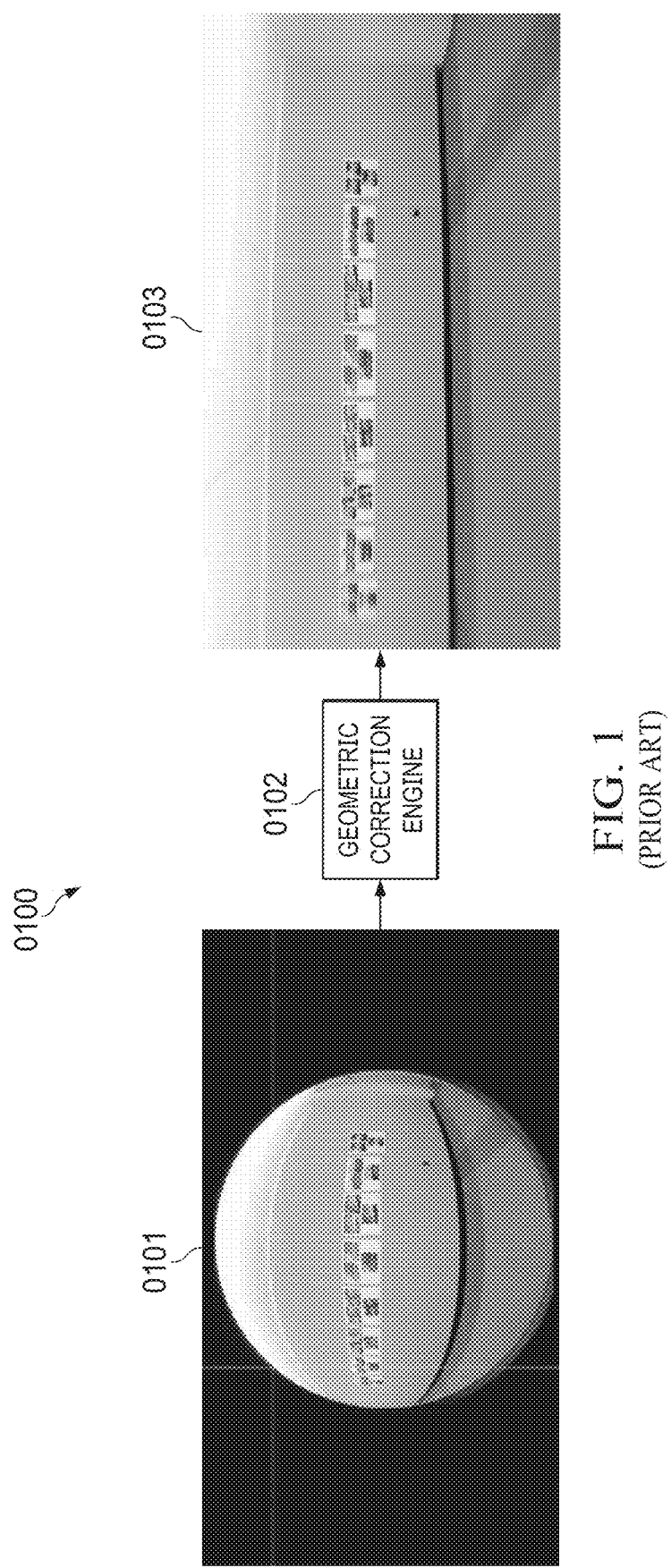
FIG. 1 illustrates a prior art distorted input frame geometrically converted to an output frame.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a geometric correction engine. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be noted that the terms "output image" and "output frame" are interchangeably used herein after to indicate an image displayed on a screen similar to frame (0202).

It should be noted that the terms "input image" and "input frame" are interchangeably used herein after to indicate an image displayed on a screen similar to frame (0201).

It should be noted that the terms "output block size" and "size of output block" are interchangeably used herein after to represent the size of an output block in an output frame. The output block size is defined by an output block width and an output block height. The terms "output block width" or the "width of the output block" are interchangeably used herein after to denote number of pixels arranged in a line. Similarly, the terms "output block height" or the "height of the output block" are interchangeably used herein after to denote number of lines in the output block. For example, an output block size may be defined as 16×20 to indicate an output block width of 16 and an output block height of 20. In other words, the number of pixels in the output block is 16 arranged in a row and the number of lines in the block is 20.

It should be noted that the terms "region size" and "size of region" are interchangeably used herein after to represent the size of a region in an output frame. The region size is defined by a region width and a region height. The region may comprise one or more output blocks. For example region size may be defined as 64×40 to indicate a region width of 64 and region height of 40. The region may be divided into equal output blocks with an output block size of 16×20. The output blocks size 16×20 may be arranged in 4 columns and the number of rows in the column is 2.

Histogram of Scaling Data with Scaling Thresholds (0500)

Figure 2:
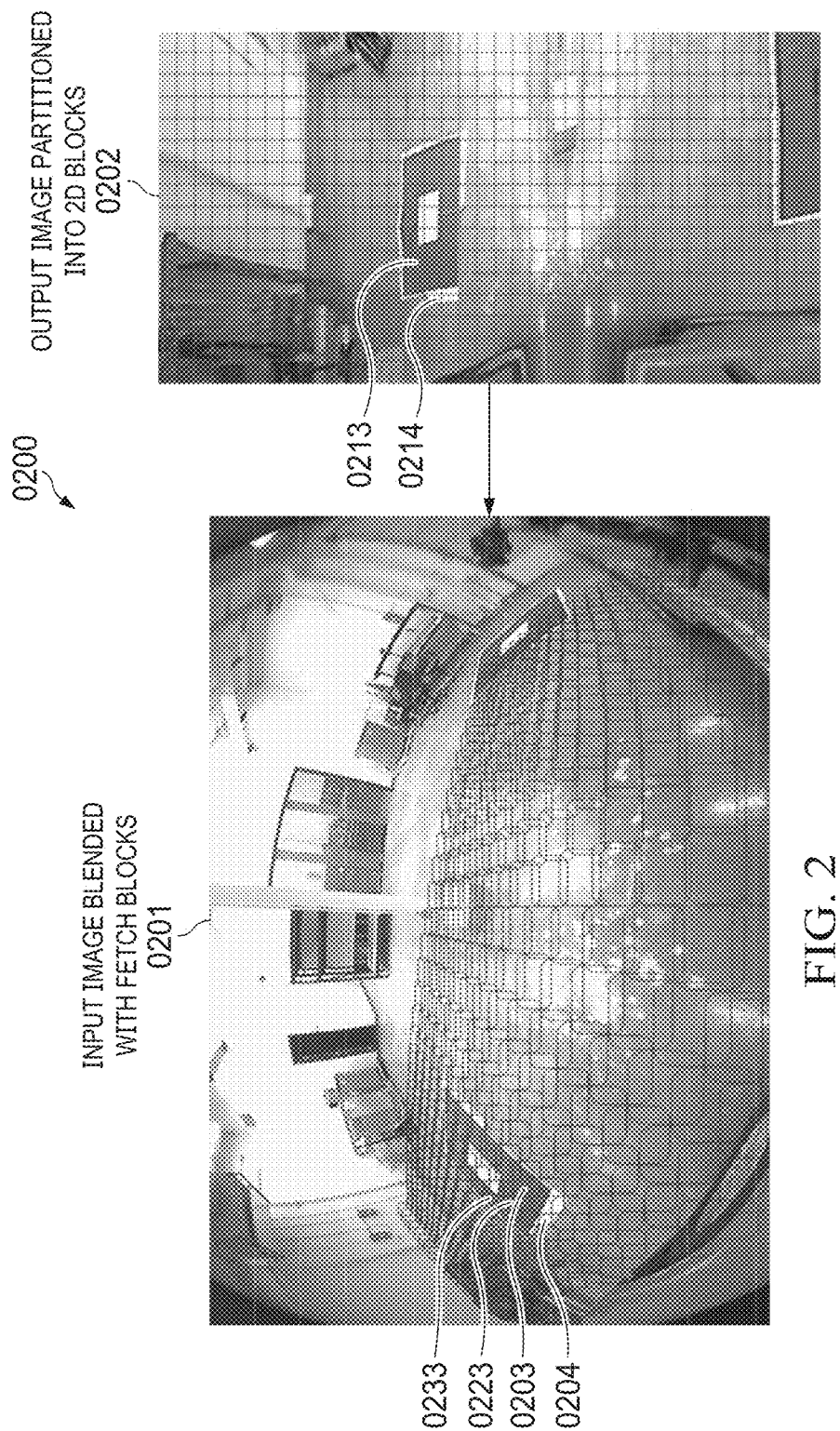
FIG. 2 illustrates a prior art output frame divided into blocks corresponding to blocks in a captured input frame.
Figure 5:
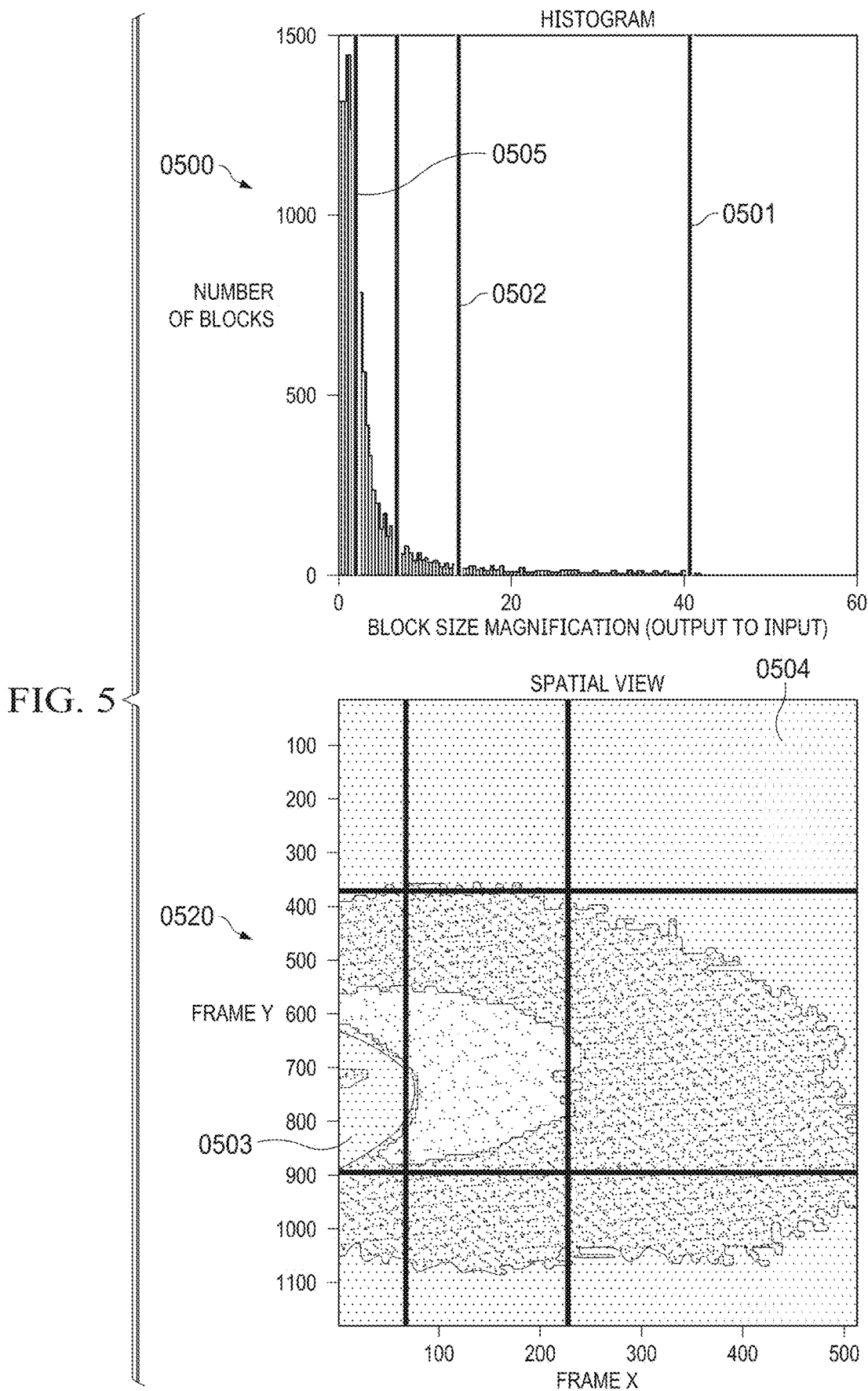
FIG. 5 depicts an exemplary histogram of scaling data of output blocks of FIG. 2, and a spatial plot of the scaling data of the output blocks in an output frame based on the scaling thresholds according to one aspect of the present invention.

FIG. 5 depicts an exemplary histogram (0500) of scaling data of output blocks of FIG. 2. After an image is initially captured, a distribution of magnification factor (ratio of fetched block size compared to output block size) may be plotted on the x-axis versus the number of blocks on the y-axis. The histogram may be plotted by an offline utility or with software running with HLOS or RTOS after the magnification data is computed and stored for each of the output blocks in the output image. It should be noted that the terms "scaling data", "scaling factor", "magnification data", "magnification factor" are interchangeably used herein after to indicate a ratio of size of input blocks required to be fetched for a corresponding size of an output block. Scaling thresholds may be determined based on the histogram (0500). For example, with reference to histogram (0500), 3 scaling thresholds (0501, 0502, and 0505) are computed or in some cases chosen. Scaling threshold (0501) indicates a scaling factor of approximately 40 and the number of blocks with a scaling factor 40 is approximately 5. Similarly, scaling threshold (0505) indicates a scaling factor of approximately 5 and the number of blocks with a scaling factor 5 is more than 1200. Prior art methods fixed the output block size based on the highest scaling factor in the output frame. In this case, the block size is based on the scaling factor of 40. The combination of a smaller block size and a large scaling factor results in fetching undesired input block data for output blocks with smaller block size. For example, if the output block size is determined to be 16×20, an output block with a scaling factor 5 ("block5") and output block with a scaling factor 40 ("block40") fetch the same maximum amount of input block size corresponding to a scaling factor of 40. In this particular example, the block5 would be fetching the same amount of input block data as block40 even though block5 requires a substantially smaller amount of input data to be fetched, in this case a factor of 8 times less. In other words, although block40 and block5 output blocks do not require the same amount of input block data to be fetched due to DDR alignment the data fetch is typically done in 128 byte groups resulting in significant unused data. In an application with wide varying magnification data (like surround view) where selection of least dimension block size leads to additional memory bandwidth, power increase and performance reduction by 50-100% based on size of local memory and correction factors.

Spatial Plot of Scaling Data Across an Output Frame (0520)

According to a preferred exemplary embodiment, a spatial plot (0520) of the scaling data of the output blocks based on the scaling thresholds is plotted for the output frame. The thresholds identified in the histogram (0500) enables the output frame to be divided into regions based on the thresholds. As illustrated in the spatial plot (0520), the area (0504) represents area with minimum magnification factors and the area (0503) represents area with maximum magnification factors. According to a preferred exemplary embodiment, the output frame is divided into regions based on the scaling factors. According to a further exemplary embodiment, the output block size is determined by the scaling factor within the region. It should be noted that the scaling factor within a region may be substantially the same. In other instances the scaling factor within a region may vary and within 20% of each other. In other instances the scaling factor within a region may vary and within 20-40% of each other. The more the number of thresholds selected from the histogram the more the number of available block sizes and the more flexibility in dividing the output frame into regions with identical scaling data.

Exemplary Spatially Adaptive Slicing Embodiment (0600)

Figure 6:
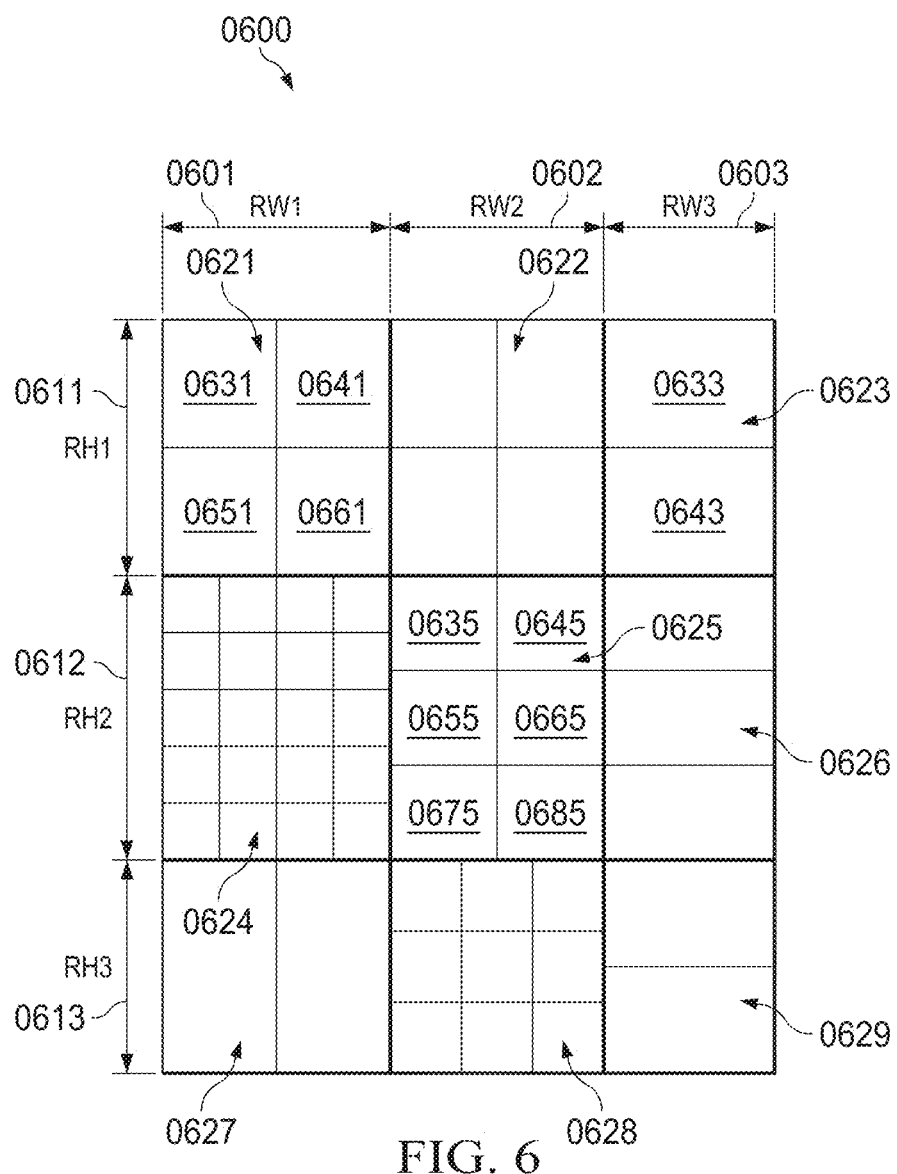
FIG. 6 is a depiction of an exemplary output frame divided into regions and each of the regions divided into blocks with different sizes based on the scaling data according to one aspect of the present invention.

FIG. 6 (0600) is a depiction of an exemplary output frame divided into regions and each of the regions divided into output blocks with different output block sizes based on the scaling data. After scaling thresholds are identified as depicted in the histogram (0500) and spatially plotting the scaling data, the output frame may be divided into multiple regions. The process may include identifying and spatially slicing the output frame into multiple slicing regions while adapting to the pattern of the transformation and the scaling data.

It should be noted that the output frame (0600) divided into 9 regions may not be construed as a limitation. The output frame may be divided into any number of regions as possible given the hardware limitations. The frame may be divided into 3 horizontal slices (0611, 0612, and 0613) corresponding to 3 heights RH1, RH2 and RH3, and frame may be divided into up to 3 vertical slices (0601, 0602, and 0603) corresponding to 3 widths RW1, RW2 and RW3. A total of 9 regions (0621-0629) may be created for the frame. Each region may be programmed with independent output block size. The output frame may be programmed with bigger block size for region with less spatial variation (i.e.

scaling factor) and smaller block size for region with high spatial variation. This may improve the band width as well as performance as portion of the image with bigger block size increases. For example, in surround view application, the block size may vary from 16×20 to 112×64 for rear camera and 32×8 to 136×160 for a front camera. The output frame may be programmed individually for input images from each of the cameras. According to an exemplary embodiment greater than 40% saving in bandwidth may be achieved. According to a more preferred exemplary embodiment a greater than 80% saving in bandwidth may be achieved. According to a most preferred exemplary embodiment a greater than 50% saving in bandwidth may be achieved.

Each of the regions may be programmed with a different block size as depicted in the output frame (0600). Region (0624), which has the maximum scaling factor (0503), is divided into 16 blocks with a minimum block size, while region (0623) which has the minimum scaling factor (0504) is divided into 2 blocks with a maximum block size. Similarly, regions (0622) and (0621) are divided into 4 blocks, regions (0623), (0626), and (0629) are divided into 2 blocks each, region (0625) is divided into 6 blocks and region (0628) is divided into 9 blocks. As clearly illustrated the output block is spatially sliced into regions with varying block sizes. According to a preferred exemplary embodiment, the size of each of the regions in the output frame may be equal. According to another preferred exemplary embodiment, the size of each of the regions in the output frame may not be equal. The output frame may be composed or constructed one region at a time in a raster scan mode. For example, region (0621) may be processed first, followed by regions (0622), (0623), (0624), (0625), (0626), (0627), (0628), and (0629) in that order. Within a region, a raster scan may be followed to compose the region. For example, within region (0621), block (0631) is processed first followed by blocks (0641), (0651), and (0661) in that order. Similarly, within region (0625), block (0635) is processed first followed by blocks (0645), (0655), (0665), (0675), and (0685) in that order. Similarly, block (0633) is processed followed by block (0643). The processing of each of the block is further described below in the method flow chart of FIG. 11. According to an exemplary embodiment, the coordinates of each of the region and each of the blocks, the size of each of the regions and each of the blocks within the region are programmed as input parameters into a hardware block to process the output image as described below in FIG. 8.

When a frame is divided into sub-set of 3×3 regions, the following combinations of regions may be supported.
- 3 vertical slices RW1=x, RW2=y and RW3=z
- 2 vertical slices RW1=x, RW2=y and RW3=0, Last region width has to be zero
- 1 vertical slice RW1=x, RW2=0 and RW3=0, Last two regions width has to be zero
- 3 horizontal slices RH1=x, RH2=y and RH3=z
- 2 horizontal slices RH1=x, RH2=y and RH3=0 Last region height has to be zero
- 1 horizontal slice RH1=x, RH2=0 and RH3=0 Last two regions height has to be zero
- A 2×2 region partitioning can be done by programming RW3=RH3=0.

Exemplary Geometric Image Processing System (0700)

Figure 7:
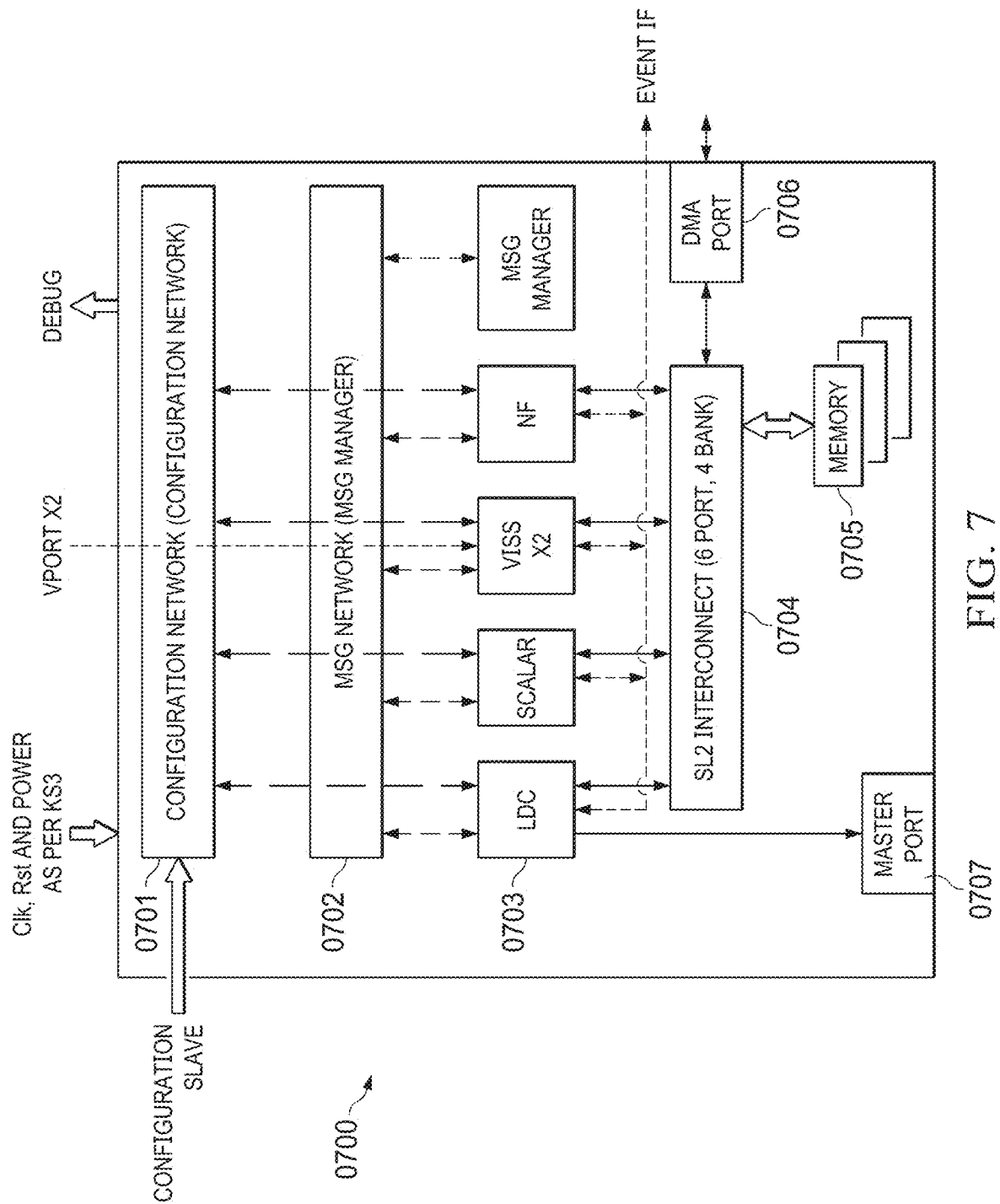
FIG. 7 illustrates an exemplary image processing system according to one aspect of the present invention.

FIG. 7 illustrates an exemplary image processing system (0700) according to one preferred embodiment. The system (0700) comprises a spatial slicing apparatus block (0703), a scalar block, a noise filter block, a sensor block, a shared memory block (0704), a message manager (0702), a network configuration block (0701), internal memory (0705), a DMA port (0706), and a hardware thread scheduler block.

The spatial adaptive slicing apparatus (0703) reads input frame from master port (0707) via DDR or on-chip and performs perspective transform as well as correction of distortion (including fisheye lenses). The output of apparatus (0703) can be sent to external memory (DDR) or sent to other hardware blocks such as scalar block or noise filter block for further pre-processing via local shared memory (0705). Spatial adaptive slicing apparatus (0703) may be targeted to operate at 120 frames per second (FPS) @300 MHz with 2M pixel frame. That performance requirement may translate to BW of approximately 1.5 GBs. In order to meet the bandwidth requirement of 1.5 GBs, a read master interface may be limited to maximum response latency of 200 cycles.

The scalar block reads data from shared memory (0704) and may generate up to 10 scaled outputs from 2 inputs with various scaling ratios ranging from 0.5 to 1. The output of scalar block to shared memory (SL2) can be further noise filtered using noise filter block or written to DDR.

The noise filter block reads data from memory (e.g. DDR or on-chip) to shared memory (0704) and performs bilateral filtering to remove noise. The output of noise filter block can be sent to external memory (e.g. DDR) from shared memory (0704) or can be further re-sized using the scalar block.

The shared level 2 (0704) memory block may be used to exchange data across hardware blocks such as apparatus (0703), scalar block, and noise filter block as well as to DMA Engine (UDMA).

A HTS (Hardware Thread Scheduler) block may be used for IPC communication among various hardware blocks such as apparatus (0703), scalar block, and noise filter block as well as to DMA Engine (UDMA). The message manager (0702) may be implemented as HTS.

The configuration manager (0701) may be used to program the hardware with typical network parameters. The system (0700) may further comprise typical hardware inputs such as clock, reset, network, data, and debug signals.

Exemplary Adaptive Slicing Apparatus Embodiment (0800)

Figure 8:
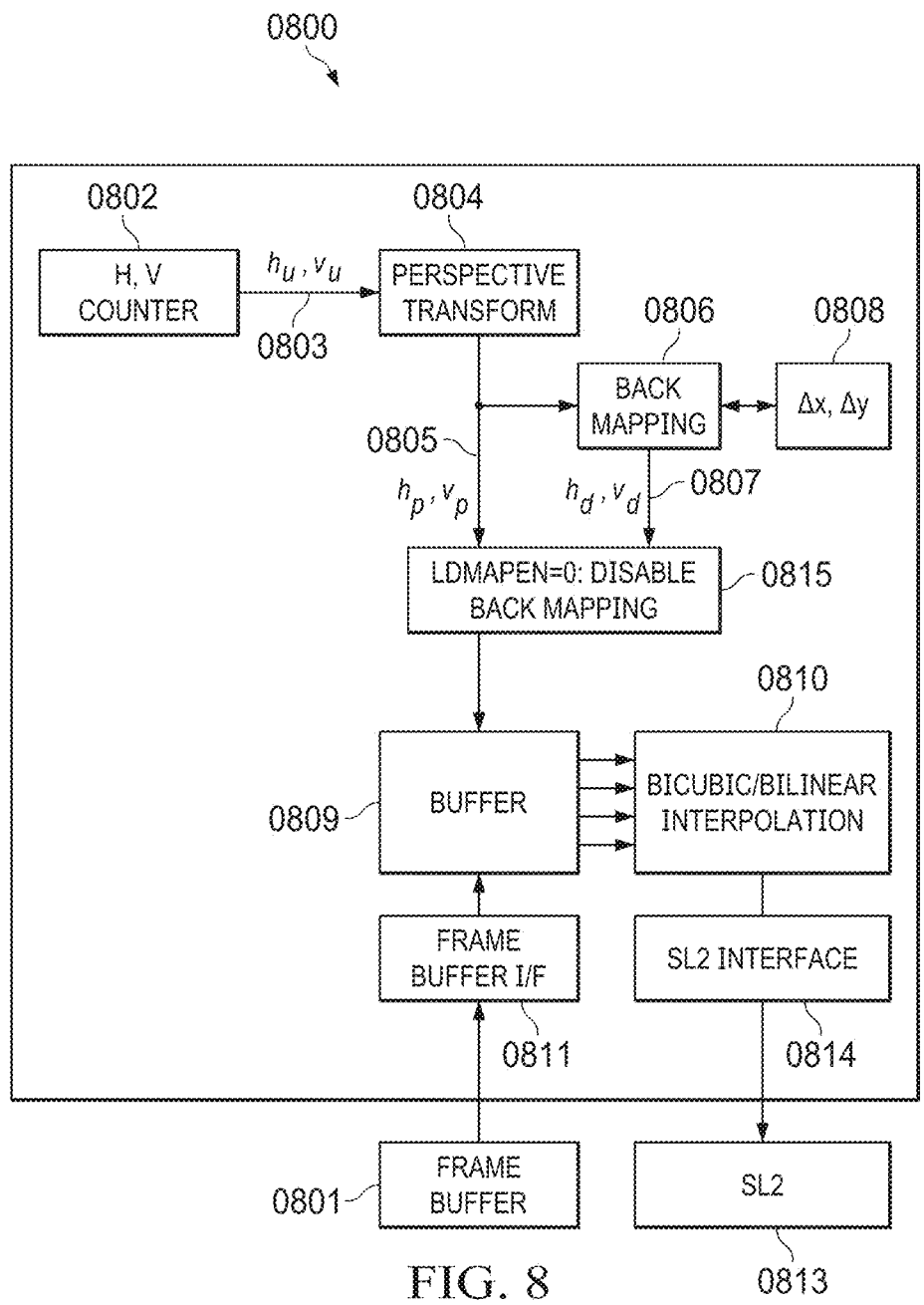
FIG. 8 illustrates an exemplary diagram of a spatially adaptive slicing apparatus according to one aspect of the present invention.

As shown in FIG. 8, the adaptive slicing apparatus (0800) comprises a counter block (0802) configured to compute output coordinates (0803) of the output frame for a region based on a size of the output block of the region; a transform block (0804) and back mapping block (0806) configured to generate input coordinates (0807) corresponding to each of the output coordinates; a bounding module (0808) configured to compute input blocks corresponding to each of the input coordinates and may comprise displacement data of each of each output block; a buffer module (0809) configured to fetch data corresponding to each of the input blocks and store in an internal memory; and an interpolation module (0810) configured interpolate data received from the buffer module; wherein the interpolated data for each of the regions is stitched, composed, and displayed on a display module. An external memory block (0801) may store the input frame, the external memory is external to apparatus. The frame buffer or the external memory block (0801) is external to the apparatus (0800) and in most instances, an off-chip SDRAM or a DDR memory. The external memory blocks stores fetch data corresponding to input blocks of an input frame such as frame (0201). According to a preferred exemplary embodiment the input frame is captured with an optical device; the optical device is selected from a group consisting of: wide angle lens, fish eye lens or any kind of automotive camera lens.

Given the coordinates of the undistorted output image such as image (0600), the corresponding coordinates of the distorted input image may be calculated by combining the output coordinates and the offsets from an offset table. Distorted pixels from the input frame are read from the frame buffer, and buffered for the bilinear interpolation. After the interpolation, corrected image may be written back and stored to the SL2 shared memory.

The counter block (0802) computes output coordinates (0803) of the output frame for a region based on a size of the output block of the region. For example, for region (0621) in FIG. 6, the output coordinates (0803) of block (0631) may include the coordinates of the 4 corners of the block (0631). The coordinates may be computed by counter block based on an output frame size that includes a frame width and a frame height. Coordinates of (0,0) (frame start co-ordinate programmable in the apparatus) may be assumed as the left corner of the frame and the coordinates of each of the regions and each of the blocks in the region may be computed. The input parameters such as region width and region height, block size, and block width provided to the slicing apparatus may in turn be input into the counter block. According to a preferred exemplary embodiment, input parameters to the apparatus comprise output frame width and output frame height, region width and region height; output block width and output block height within a region. The counter block may compute the output coordinates (0803) as ($h_u$, $v_u$).

In order to carry out geometric correction efficiently in time and frame buffer traffic, the hardware processes the output frame in small output blocks. Software running on HLOS or RTOS may configure appropriate parameters then initiate spatially adaptive slicing function by writing to a control register in the hardware. The hardware may store and maintain a bank of registers used for storing control and data information. The hardware controls the sequencing through output blocks, DMA transfers, and computation to process an entire image autonomously. An interrupt, if enabled, is asserted at the completion of the processing and composition of the output image.

The hardware may also be stalled and controlled on a macro-block basis by an external controller. An intermediate interrupt may be provided by the apparatus (0800) to facilitate the stalling of the hardware. Stalling the apparatus (0800) may be achieved by deasserting a write request enable on the output write port.

When a camera is viewing a scene from two different positions or when multiple cameras are viewing the scene from different positions, a transformation between the two viewing angles is needed to align the images. Under specific conditions, the class of geometric transformations known as "homography", or planar-perspective transformation, will capture the geometric relationship between the images accurately. Common applications of homography transforms are to align (or stitch) multiple frames of the same scene to compute a panoramic output image. A second application is the alignment of planar surfaces in the world. Finally, perspective transforms are also useful in computing depth maps from a stereo image pair. By rectifying the two views, the search to compute disparity between the two views is simplified to a 1-D search problem. The homography is defined by a 3×3 transformation matrix, as in $$h_{aff} = a*h_u + b*v_u + c \quad (1)$$

$$v_{aff} = d*h_u + e*v_u + f \quad (2)$$

$$z = g*h_u + h*v_u + l \quad (3)$$

$$h_p = h_{aff}/z$$

$$v_p = v_{aff}/z$$

The affine transform is a subset of the perspective transformation. By setting g=h=0, $h_p$=haff and $v_p$=vaff. The mapping from destination coordinate to the source coordinate is expressed as $$h_{aff} = a*h_u + b*+c$$

$$v_{aff} = d*h_u + e*+f$$

Where $h_u$ and $v_u$ are horizontal and vertical coordinates of the source coordinates and $h_{eff}$ and $v_{eff}$ are the horizontal and vertical coordinates of the destination coordinates. a, b, c, and f are correlation and transform factors.

In image alignment applications, the homography matrices may be computed by locating corresponding points in the two frames and estimating the matrix parameters to transform the set of points in one frame onto the corresponding points in the second frame. In the stereo rectification application, the matrix is determined (pre-computed) at the calibration step and remains fixed.

In YCbCr mode, the offset table (0808) defines a (☐x, ☐y) vector for a regular grid of output points. The grid can be fully sampled or down sampled. A fully sampled grid will define an offset vector for every output pixel, defining where to fetch the input data to compute the output pixel. This is the most precise definition and can capture rapidly changing offset tables. The drawback is that it will require a large amount of memory bandwidth as the geometric correction engine will be reading offset values for every output pixel. Since most offset tables are not expected to change rapidly in a small spatial region, a subsampled offset table may be read. Offset tables can be subsampled by powers of two in both horizontal and vertical directions and the subsampling factor is set in a register. This mode conserves memory bandwidth by reducing the amount of data read to describe the offset vectors, but requires more hardware to interpolate the missing offset vectors.

$$x_i = x_o + \Delta x$$

$$y_i = y_o + \Delta y$$

The output coordinates (0803) ($h_u$, $v_u$) from the counter block may be input to a perspective transform block (0804) and after transformation using any of the equations (1,2,3) aforementioned the transformed output coordinates (0805) ($h_p$, $v_p$) may be input to a mesh mapping block (0806). If back mapping is enabled in a mux block (0815), the coordinates (0807) ($h_d$, $v_d$) calculated by the back mapping block is input to the buffer block (0809). If back mapping is not enabled in a mux block (0815), the coordinates (0805) ($h_p$, $v_p$) calculated by the perspective transform block (0804) is input to the buffer block (0809).

Figure 9:
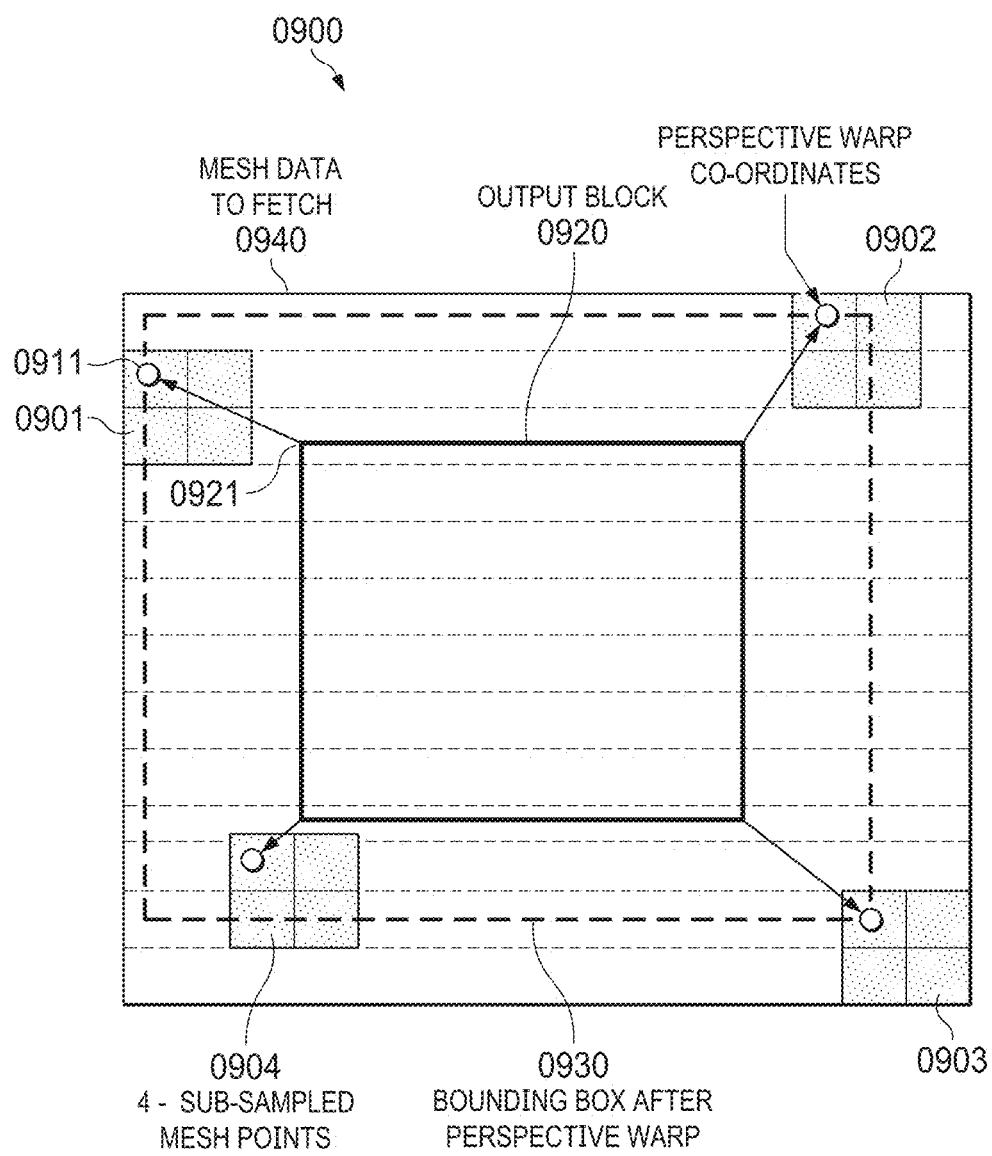
FIG. 9 illustrates an exemplary diagram of a perspective coordinate determination apparatus according to one aspect of the present invention.

FIGS. 9 (0900) and 10 (1000) illustrate an exemplary mesh mapping and back mapping blocks according to a preferred embodiment. The perspective transform block (0804) does perspective warping on 4 corners of the output block to find out mesh block to fetch. The input coordinates (0805) ($h_p$, $v_p$) to a mesh mapping block (0806) such as coordinate (0911) is subsampled. Rectangular bounding box is calculated such that it contains mesh points referred by 4 corner pixels (sub-sampled) generated by perspective warp block. Bilinear interpolation may be done to up-sample the mesh sub-sample to pixel co-ordinate precision. For the mesh bilinear interpolation, one extra column on right and one extra at the bottom may be fetched. For a given output block (0920), perspective wrap coordinates such as (0911) for top left corner are calculated and bounding box (0930) is generated after sub sampling mesh points (0901, 0902, 0903, 0904). After adding a buffer, a final output mesh block (0940) is generated.

Once mesh block fetch is completed, final input co-ordinates are calculated by applying back mapping on previously calculated perspective warp corner pixel co-ordinates. Additional padding is applied on top of these back mapped corner co-ordinates based on the interpolation type.

It is possible that the bounding box calculated by hardware may not cover all the input data required to generate particular output block. In such cases, software may apply an additional PixelPad, the amount of padding in input block in all directions. For each output pixel in the output block with a size OBW×OBH, the input pixels required are indeed bounded by back mapping of the 4 corners plus/minus the padding. More precisely, the input block may be determined by the following equations:

IBX_start=min(truncate(distortx(corner1)),truncate(distortx(corner3)))−Hw_Pad−PixelPad IBX_end=max(truncate(distortx(corner2)),truncate(distortx(corner4)))+Hw_Pad+PixelPad IBY_start=min(truncate(distorty(corner1)),truncate(distorty(corner2)))−Hw_Pad−PixelPad IBY_end=maxn(truncate(distorty(corner3)),truncate(distorty(corner4)))+Hw_Pad+PixelPad where corner1, corner2, corner3, and corner4 are upper-left, upper-right, lower-left, and lower-right corners of the OBW×OBH output block, and distortx(.), distorty(.) are X and Y coordinates of the corners after perspective wrap and back mapping.

For a geometric distortion correction, PixelPad is zeroed out to accommodate neighbor sets for all colors. Software may set the PixelPad such that information of the input blocks is not dropped. According to a preferred exemplary embodiment, the bounding module is further configured to add a buffer pixel pad to each of the input blocks increasing the size of the input blocks.

OBH and OBW may be chosen as reasonably large for efficient operation of adaptive slicing and geometric correction operation. According to a preferred exemplary embodiment, the region width ranges from 4 to 8094; and the region height ranges from 2 to 8094. According to a preferred exemplary embodiment, the output block width ranges from 4 to 254; and the output block height ranges from 2 to 254. OBW is constrained to ensure efficient external memory write. Another constraint is that input block size, for each input block of the image, the allocated input buffer needs to accommodate without overflowing. If the parameters OBH, OBW are set too small, or PixelPad too large, performance may degrade and unintended and undesired external memory transfer may be happen.

An off-line utility program may be utilized to program and configure the apparatus (0800). Given offset table contents, processing parameters, and maximal input buffer size, the program computes an optimal set of OBW, OBH, and PixelPad to minimize input bandwidth. Another utility may be provided with a functional C model that computes the minimum PixelPad given a configuration and the processing block size with OBW (output block width) and OBH (output block height).

The hardware can be utilized to process a portion of the image, rather than the whole image. This allows an image to process through multiple software/hardware interactions to correct only a portion of the image to save time.

An intermediate interrupt, may also be provided on completion of each macroblock output write. This allows the geometric correction operation to be pipelined with other tasks. The apparatus (0800) output write stall after this event, waiting for a pulse on a start signal to begin writing the next macro block.

Figure 10:
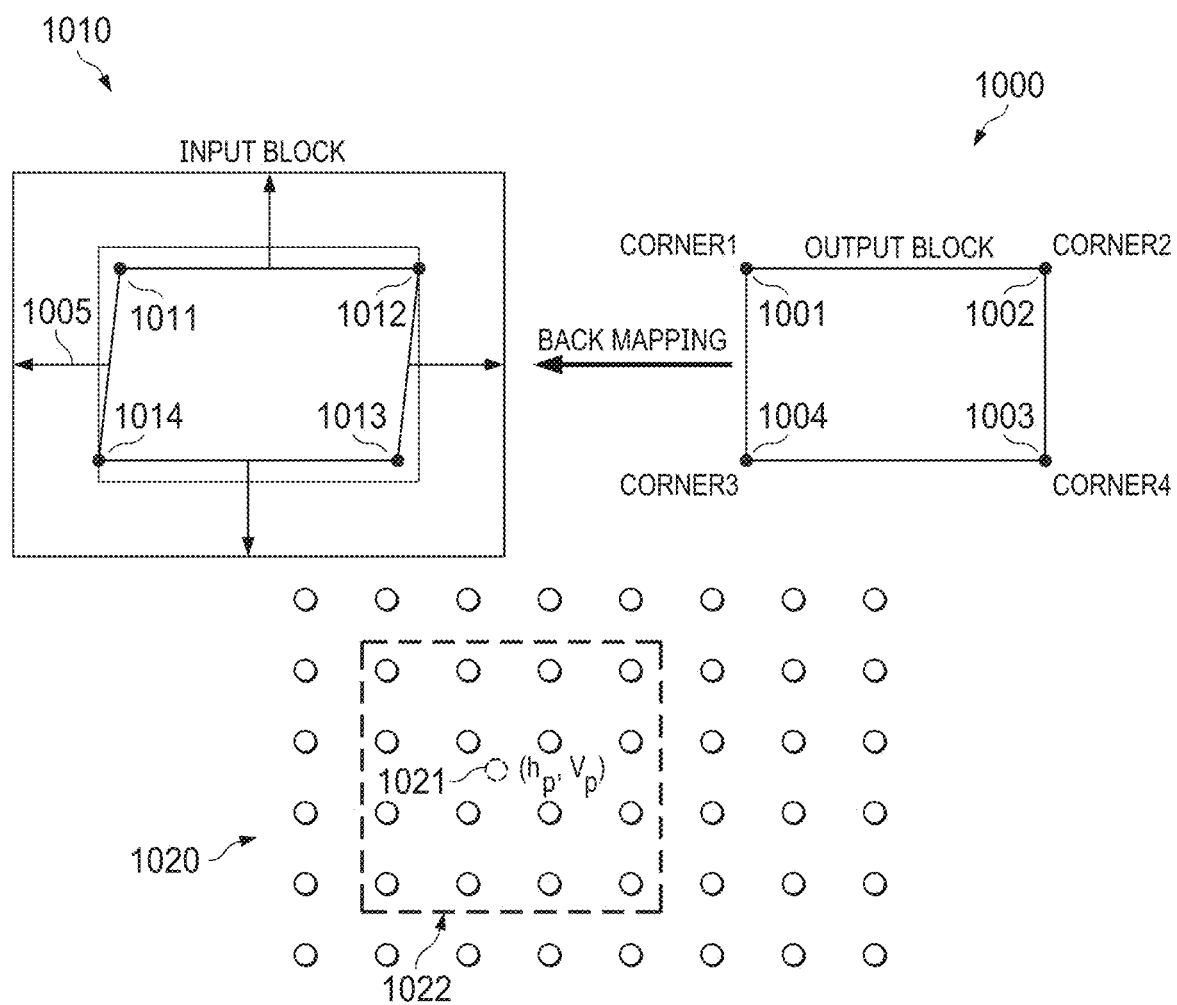
FIG. 10 illustrates an exemplary block diagram of back mapping output coordinates in an output block to input coordinates in an input block and interpolation block according to one aspect of the present invention.

As the coordinates (0807) ($h_d$, $v_d$) calculated by the back mapping block (0806) are not integer values in most cases, either bi-cubic or bilinear interpolation is applied to the distorted pixels with the interpolation block (0810). Other interpolation techniques may also be applied. According to a preferred exemplary embodiment, interpolation data is interpolated with a bi-cubic or bilinear interpolation. Depending on register configuration, either bi-cubic or bilinear interpolation is used to interpolate the output Y pixels. In the case of bi-cubic interpolation, the distorted input pixel is interpolated from the 16 Y pixels in the 4×4 grid around the distorted input location, as shown in FIG. 6. Bi-cubic interpolation is used first along the horizontal direction, then the vertical direction. FIG. 10, (1020) illustrates a Bi-cubic interpolation of data (1021) in an output block (1022). The interpolated data may be further stored in a memory (0813) though an interface (0814). After the input coordinates corresponding to the input blocks to be fetched are determined, the input blocks are fetched into an internal memory in a buffer (0809) through a buffer interface (0811). According to a preferred exemplary embodiment, the size of the internal memory ranges from 10 KB to 100 KB. In some instances the size of the internal memory ranges from 1 KB to 100 KB. In other instances size of the internal memory ranges from 10 KB to 50 KB.

FIG. 10 (1000) depicts exemplary output coordinates to input coordinates after perspective mapping and back mapping. According to a preferred exemplary embodiment, the output coordinates comprise the coordinates of the four corners of a block in the output frame/region. Individual coordinates for each of the corners may also be provided as the output coordinates. According to a preferred exemplary embodiment the input coordinates comprise the coordinates of the four corners of a block in the input frame after perspective transform of the output coordinates and back mapping. Individual coordinates for each of the corners may also be provided as the input coordinates. An output block defined by the corners (1001), (1002), (1003), and (1004) are mapped to input block corners (1011), (1012), (1013), and (1014), respectively. The final input block size is padded up with a size (1005) so that a larger input block (1010) is fetched and information is not lost in the final output image. According to a preferred exemplary embodiment, the interpolated data is further processed through modules configured to filter, reduce noise, scaled and formatted. According to another preferred exemplary embodiment, the output frame is displayed on a display device; the display device selected from a group consisting of: automotive display, LED monitor, television screen, and LCD monitor. According to a preferred exemplary embodiment, the output frame is processed in a raster scan mode within each block in a region and within each region.

Exemplary Geometric Correction of an Input Frame with a Spatially Adaptive Apparatus Method (1100)

Figure 11:
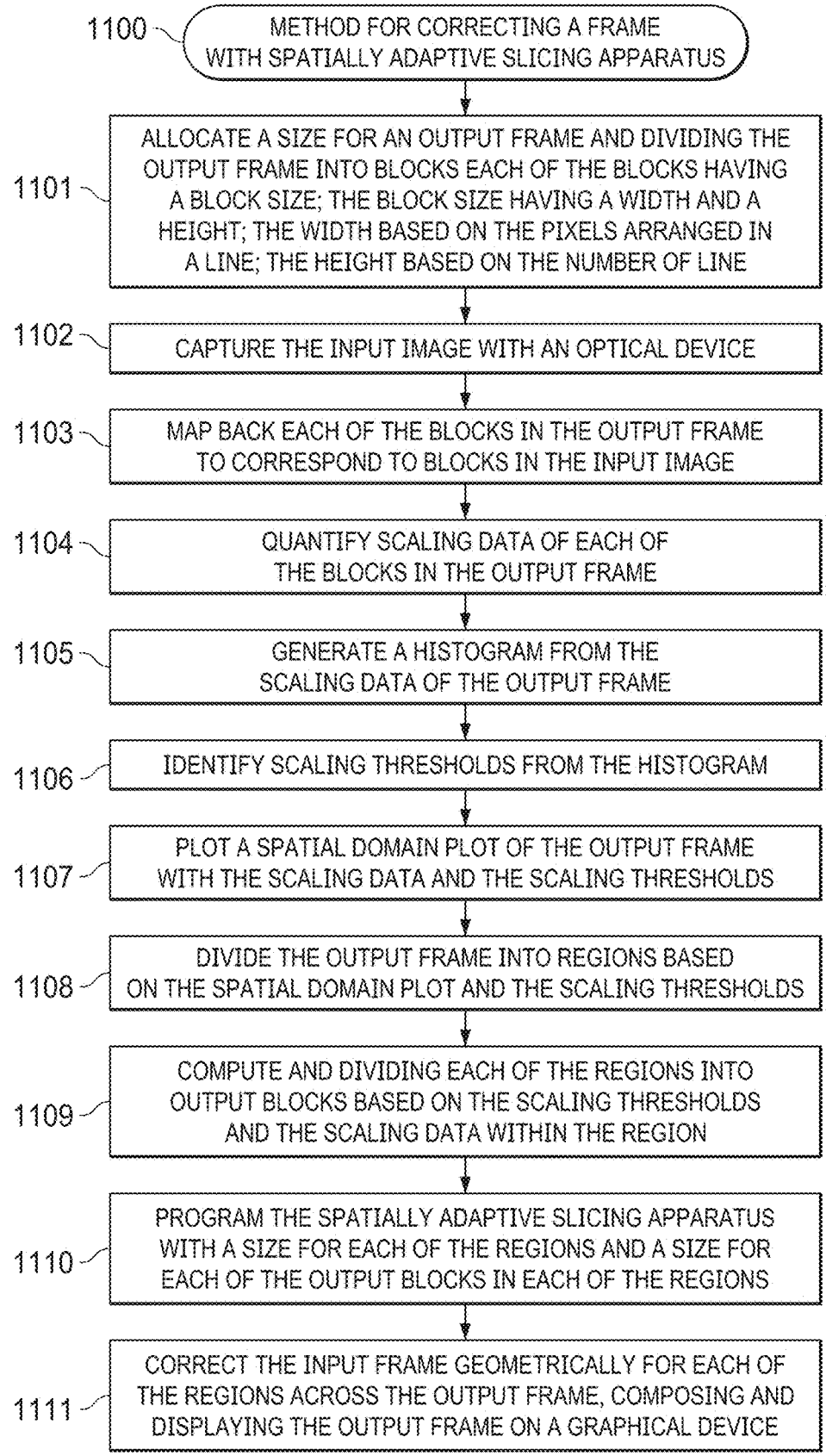
FIG. 11 is an exemplary flowchart of a method for correcting an input frame and generating an output frame with a spatial slicing apparatus according to one aspect of the present invention.

As generally seen in the flow chart of FIG. 11 (1100), a preferred exemplary geometric correction method may be generally described in terms of the following steps:

1) allocating a size for an output frame and dividing the output frame into blocks; each of the blocks having a block size; the block size having a width and a height; the width based on the pixels arranged in a line; the height based on the number of lines (1101);

As described in FIG. 2, the size of the output frame may be allocated based on the frame to be displayed on a screen. Software or a utility may determine, allocate, and configure a hardware register with a frame size comprising a frame width and a frame height. For example, the output frame for a 4K display may be allotted to be 3840×2160. In another example a HD display of 1920×1080 or 2 Mega pixel may be allotted.

2) capturing the input image with an optical device (1102);

The captured image may be stored in an external memory with the individual fetch blocks.

3) mapping back each of the blocks in the output frame to correspond to blocks in the input image (1103);

Software or a utility may determine and identify fetch blocks corresponding to each of the output blocks.

4) quantifying scaling data of each of the blocks in the output frame (1104);

Scaling thresholds may be determined based on the histogram (0500). For example, with reference to histogram (0500), 3 scaling thresholds (0501), (0502), and (0505) are computed or in some cases chosen. Scaling threshold (0501) indicates a scaling factor of approximately 40 and the number of blocks with a scaling factor 40 is approximately 5. Similarly, scaling threshold (0505) indicates a scaling factor of approximately 5 and the number of blocks with a scaling factor 5 is more than 1200.

5) generating a histogram from the scaling data of the output frame (1105); a distribution of magnification factor (ratio of fetched block size compared to output block size) may be plotted on the x-axis versus the number of blocks. The histogram may be plotted by an offline utility or with software running with HLOS or RTOS after the magnification data is computed and stored for each of the output blocks in the output image 6) identifying scaling thresholds from the histogram (1106);

7) plotting a spatial domain plot of the output frame with the scaling data and the scaling thresholds (1107);

a spatial plot (0520) of the scaling data of the output blocks based on the scaling thresholds may be plotted for the output frame.

8) dividing the output frame into regions based on the spatial domain plot and the scaling thresholds (1108);

9) computing and dividing each of the regions into output blocks based on the scaling thresholds and the scaling data within the region (1109);

The output frame may be divided into any number of regions as possible given the hardware limitations. For example, the frame may be divided into up to 3 horizontal slices (0611, 0612, and 0613) and 3 vertical slices (0601, 0602, and 0603) for a total of 9 regions (0621-0629). Each region may be programmed with independent output block size. The output frame may be programmed with bigger block size for region with less spatial variation (i.e. scaling factor) and smaller block size for region with high spatial variation. This may improve the band width as well as performance as portion of the image with bigger block size increases. For example, in surround view application the block size may vary from 16×20 to 112×64 for right camera and 32×8 to 136×160 for a front camera.

10) programming the spatially adaptive slicing apparatus with a size for each of the regions and a size for each of the output blocks in each of the regions (1110); and For example an output block size may be defined as 16×20 to indicate an output block width of 16 and an output block height of 20. In other words, the number of pixels in the output block is 16 arranged in a row and the number of lines in the block is 20. The region size is defined by a region width and a region height. The region may comprise one or more output blocks. For example region size may be defined as 64×40 to indicate a region width of 64 and region height of 40. The region may be divided into equal output blocks with an output block size of 16×20. The output blocks size 16×20 may be arranged in 4 columns and the number of rows in the column is 2.

11) correcting the input frame geometrically for each of the regions across the output frame, composing and displaying the output frame on a graphical device (1111).

Figure 3:
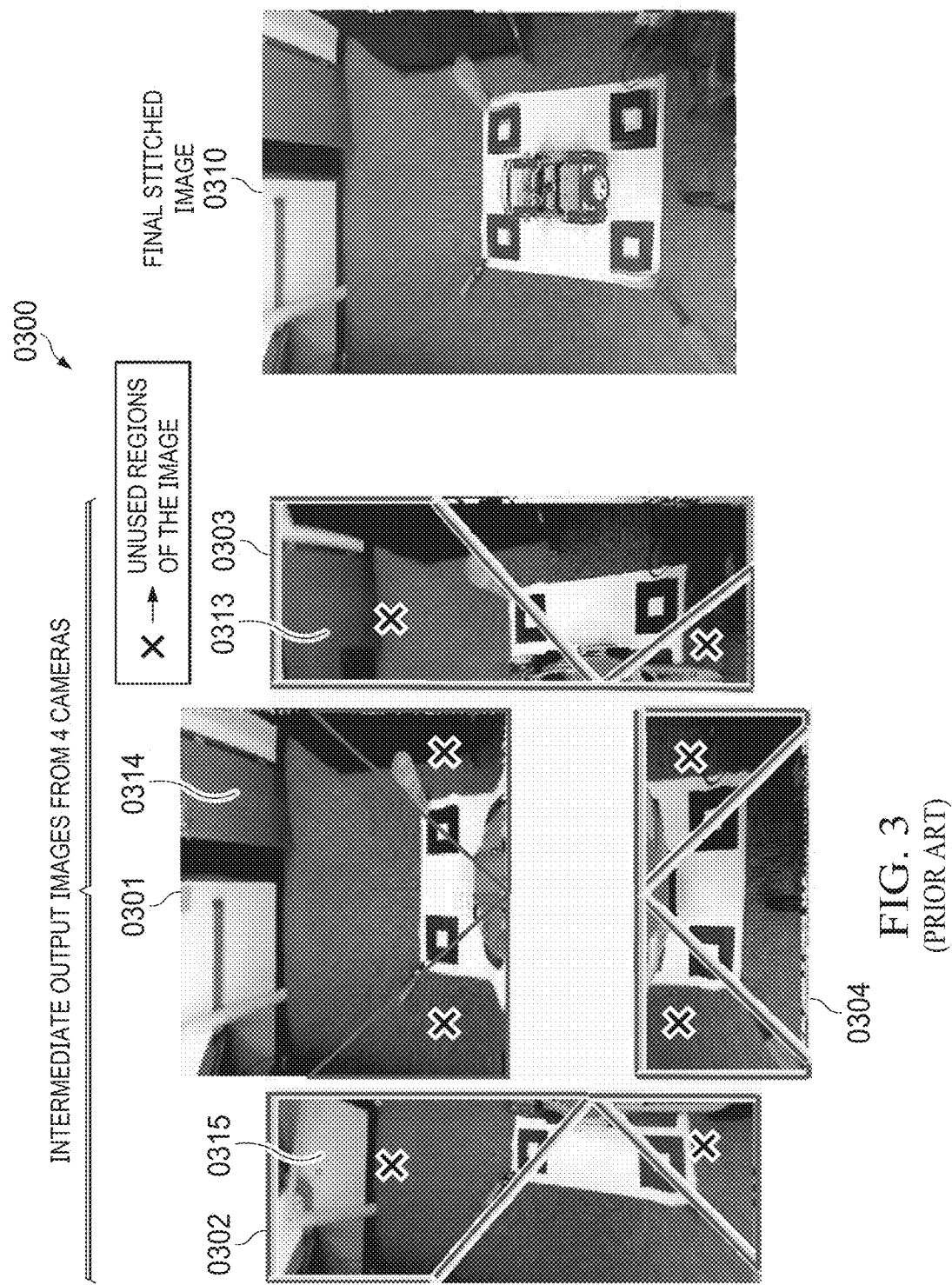
FIG. 3 illustrates a prior art input image captured by multiple cameras and stitched into an output image.
Figure 4:
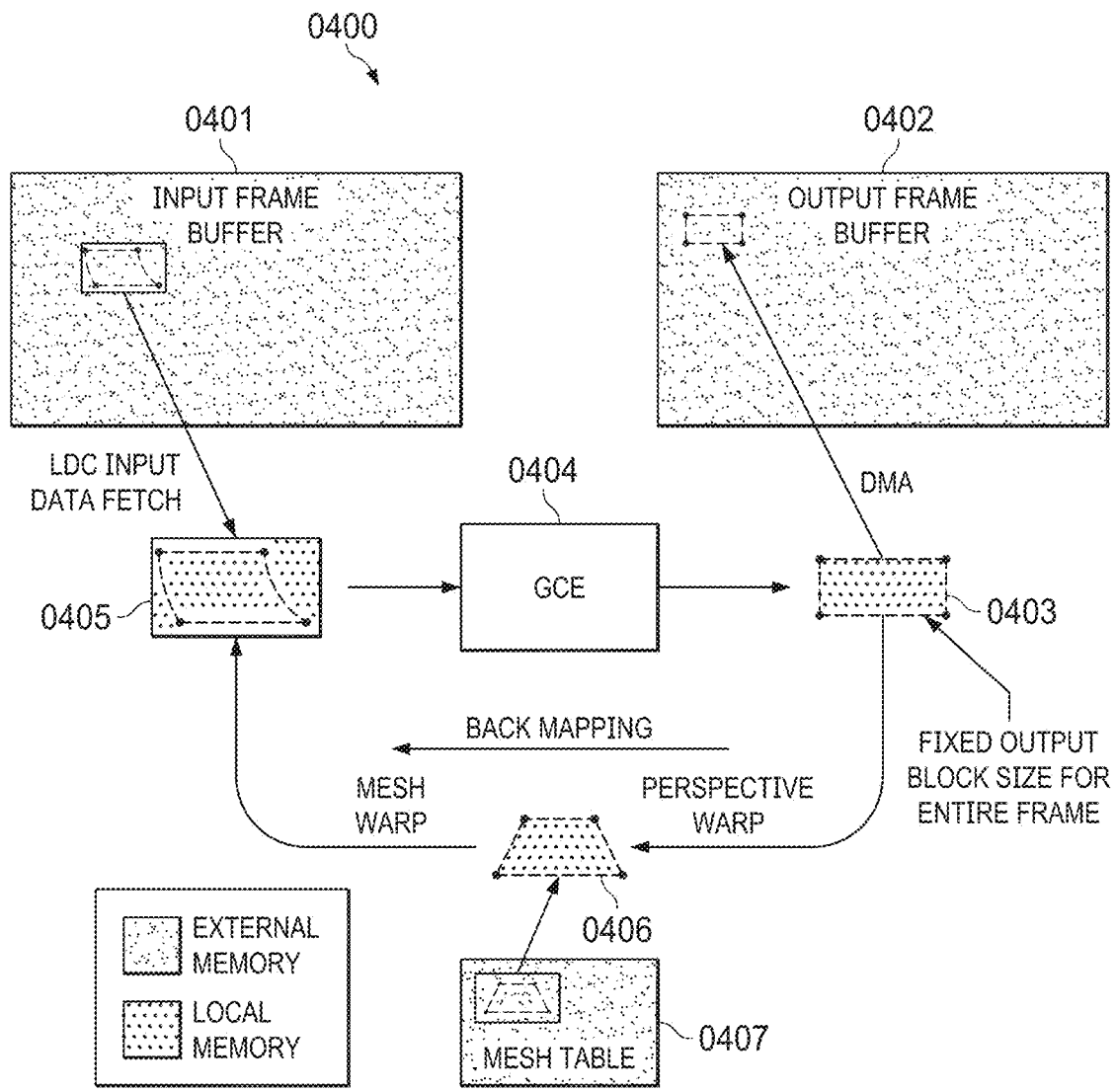
FIG. 4 illustrates a prior art geometric correction of an input frame buffer to generate an output frame buffer through back mapping and mesh data.
Figure 12:
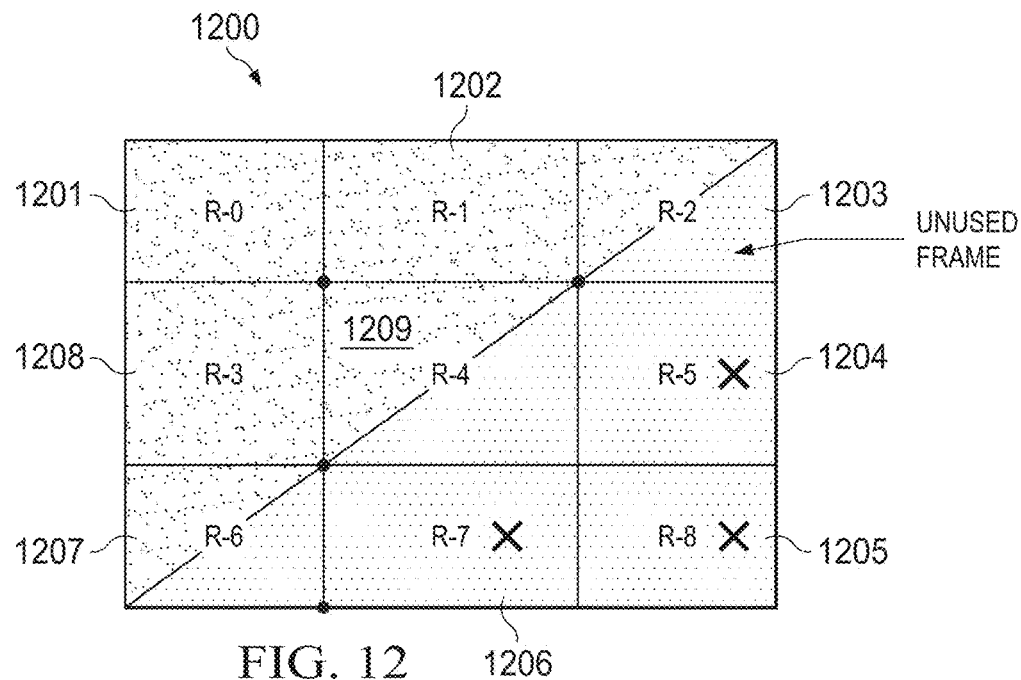
FIG. 12 illustrates an exemplary diagram of an output frame with redundant blocks identified in regions according to one aspect of the present invention.

FIG. 12 illustrates an exemplary diagram of an output frame (1200) with redundant blocks identified in regions according to a preferred embodiment. The output frame may be divided into regions (1201, 1202, 1203, 1204, 1205, 1206, 1207, 1208, and 1209). The regions may be equal or unequal in size. The regions may further comprise output blocks. According to a preferred exemplary embodiment, the output frame may be divided with the method (1100). Input images are captured with multiple cameras and the output image is blended and stitched from the input images. An input image of a place or an object may be captured by a camera or any optical device with a particular view. Another input image may be captured by a camera or any optical device with a particular view and with the camera mounted at a different position. Similarly, multiple input images may be captured with different cameras mounted at different places and capturing the same input image from a different view. For examples in FIG. 3, images (0301), (0302), (0303), and (0304) are captured with cameras mounted on the front, left, right, and rear of an automobile respectively. The shapes of the input images may also be arbitrary. According to a preferred exemplary embodiment, the output image may be shaped as a rectangle irrespective of the arbitrary shapes of the input images. The multiple images captured from different viewpoints contain redundant information. For example, the region (0314) captured by a central camera is also captured in the region (0313) by a left camera and captured in the region (0315) by a right camera. Similarly, in FIG. 12, regions (1204), (1205), and (1206) contain redundant regions. Each of the identified redundant regions may contain one or more valid blocks and one or more redundant blocks. The redundant regions are double processed for stitching and processing the same image. There is considerable loss of performance due to cycles spent in fetching and processing the redundant blocks. According to a preferred exemplary embodiment, an exemplary apparatus identifies and skips the processing of the redundant blocks.

Due to redundancy, some regions of the frame may not be used for stitching of final frame. By programming a register to disable the processing of the region, hardware skips the processing of particular region that is identified as redundant. A frame done signal may be sent on last pixel of last valid region. As an example shown in FIG. 12, region (1204), region (1205) and region (1206) are skipped for processing. A frame done signal may be passed on last pixel of region (1207). Ordering and numbering of the regions will remain the same even in the case of skipping some regions.

A portion (1301) of an output image (1303) may be skipped while processing some regions, the following parameters may be programmed into an apparatus such as apparatus (0800).

InitX X coordinate of upper-left corner of output frame
InitY Y coordinate of upper-left corner of output frame
FrameW Width of output compute frame
FrameH Height of output compute frame
FrameBase SDRAM address of upper-left corner of output frame (Y and Cb/Cr base may be needed in case of YCbCr420).
FrameOfst SDRAM frame width (in bytes)

In some embodiments FrameW may be a multiple of OBW, FrameH may a multiple of OBH, and FrameBase a multiple of 64 (byte address).

Figure 13:
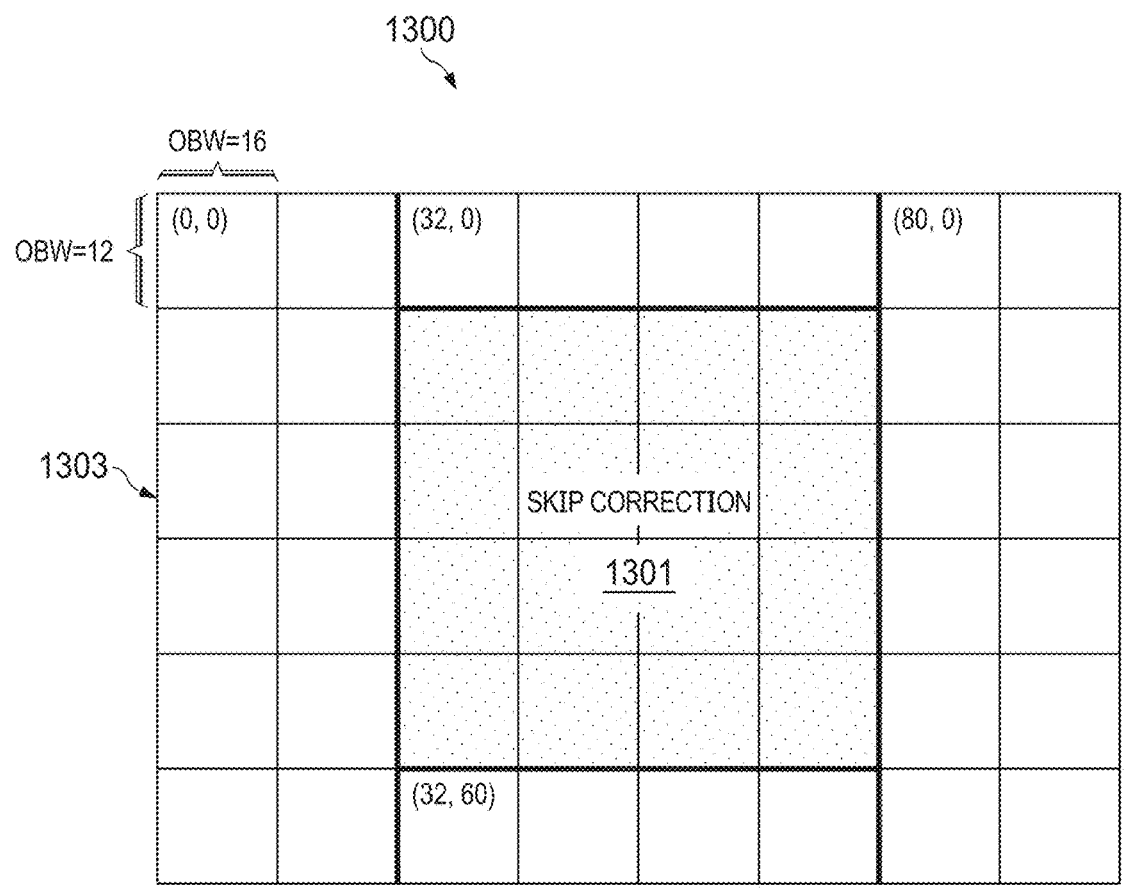
FIG. 13 illustrates an exemplary diagram of an output frame with redundant blocks skipped in regions in multi frame processing according to one aspect of the present invention.

FIG. 13 (1300) shows an embodiment of multiple-pass processing with middle-of-the-image being skipped in 8-bit format. The apparatus (0800) can be programmed with the valid regions and skipped blocks enabled allowing the processing to be completed in a single pass. The apparatus (0800) does not copy skipped blocks from the input frame to the output frame and software or a utility program may set up and initiate the memory copy of the valid regions. The starting address of input frame, corresponding to input coordinate (0, 0), may be specified as a register as well. The apparatus (0800) may clip the input block to input frame size if any of the input block falls outside input frame. The apparatus (0800) may function as an arbitrary shaped apparatus for use in method (1400) with the output coordinates (0803) ($h_u$, $v_u$) from the counter block disabled for the regions that are skipped. Similarly, the apparatus (0800) may function as an dynamic partition apparatus for use in method (1600) such that the coordinates corresponding to the blocks after division is input to the counter block programmed into the counter block and the output coordinates (0803) ($h_u$, $v_u$) generated from the counter block.

Exemplary Geometric Correction of an Input Frame Method (1400)

Figure 14:
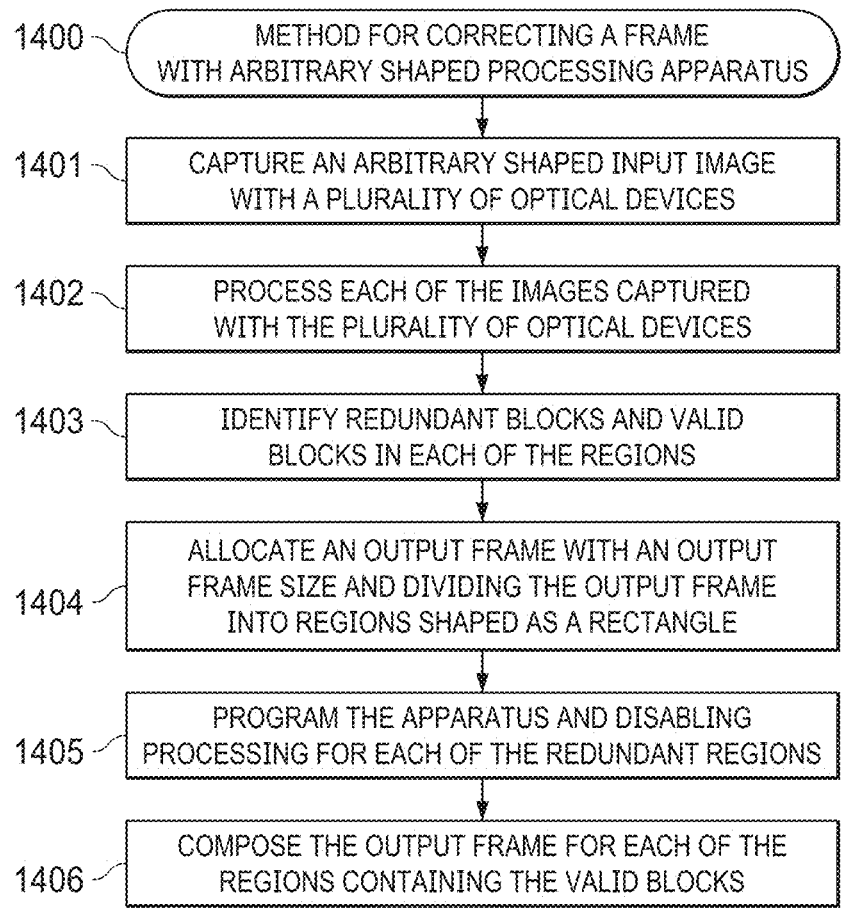
FIG. 14 is an exemplary flowchart of a method correcting an input frame and skipping redundant blocks in generating an output frame and deciding regions for best approximation to avoid unused portion of the image according to one aspect of the present invention.

As generally seen in the flow chart of FIG. 14 (1400), a preferred exemplary method for geometric correction of an input frame with an arbitrary shaped apparatus (0800) to generate an output frame may be generally described in terms of the following steps:

1. capturing an arbitrary shaped input image with a plurality of optical devices (1401);
    a capture block capturing the input image includes storing the input image in an external memory. The image may be arbitrary shaped such as square, rectangle, oval, or elongated.
2. processing each of the images captured with the plurality of optical devices (1402);
    An image processing module may process the images and store the images in an external memory.
3. identifying redundant blocks and valid blocks in each of the images (1403);
    An identifying module in this step compares data within the arbitrary shaped input image from each of the optical devices and identifies blocks with duplicate and/or dissimilar data in adjacent regions.
4. allocating an output frame with an output frame size and dividing the output frame into regions shaped as a rectangle (1404);
    An allocating module may decide on the regions after finding unused/invalid blocks for best mapping of invalid blocks to skipped regions.
5. programming the apparatus and disabling processing for invalid blocks in each of the redundant regions (1405); and
    This step includes a programming module that voids or disables the coordinates for each of the redundant blocks to process a block within a region. The output coordinates (0803) ($h_u$, $v_u$) from a counter block may be disabled for the regions that are skipped. The programming module performs an automatic computation of input coordinates of input blocks to be fetched corresponding to each of the output blocks. The four corners of a block in the input frame after perspective transform of the output coordinates and back mapping may be programmed by the programming block. The programming module programs the input parameters to the apparatus, the input parameters include: output frame width and output frame height, region width and region height; output block width and output block height within a region and each region enable/disable control.
6. composing the output frame for each of the regions containing the valid blocks(1406).

Figure 15:
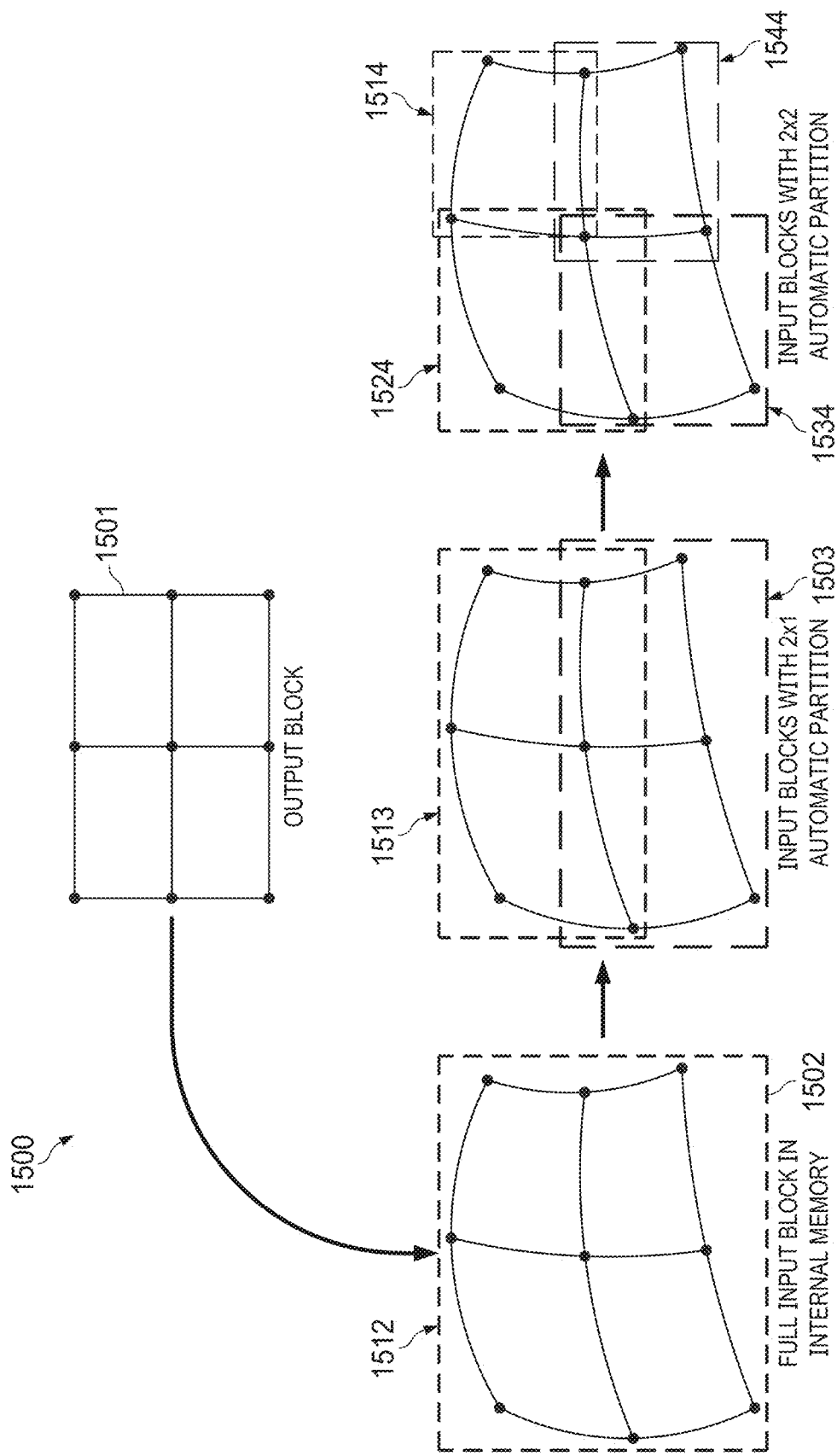
FIG. 15 illustrates an output block in an output frame dynamically divided to fit and fetch into an internal memory according to one aspect of the present invention.

FIG. 15 (1500) illustrates an output block in an output frame that dynamically divided to fit and fetch into an internal memory according to a preferred exemplary embodiment. An input buffer corresponding to output block (1501) may be fetched into an internal memory in a frame buffer from an external memory. According to an exemplary embodiment, if a size of the input block (1502) corresponding to the output block (1501) fits into an internal memory (1512), then the input block (1502) is fetched into the internal memory. In this case, a dynamic division of the input block may not be required. For example, if the size of the input block is 640×20 and the size of the internal memory is 12800 Bytes, then the input block is completely fetched in one fetch transaction or cycle. According to another preferred exemplary embodiment, if the size of the input block corresponding to the output block (1501) is greater than the size of the internal memory, the input block is computed by dividing the output block into sub blocks. If the size of each sub input block is less than the size of the internal memory, the sub blocks may be each fetched individually or together into the internal memory. Likewise, if the size of any sub input block is greater than the size of the internal memory, and the sub output blocks are further divided until the size of the sub input blocks after computation and division are less than the size of the internal memory so that each sub input block after division is fetched into the internal memory. For example, if the size of the input block (1502) is 640×20 and the size of the internal memory is 6400 bytes, then the output block may be dynamically divided into two sub blocks (1503 and 1513) so that the size of the sub blocks are 640×10 each which fit into the internal memory. If the size of the internal memory is 3200 bytes, then the divided sub blocks are further dynamically divided into sub blocks (1514, 1524, 1534, and 1544). The division of the sub blocks may be horizontal or vertical. In other words the height of the input blocks may be divided in a horizontal division and the width of the input block may be divided in a vertical division. In other examples the internal memory may be fixed and input block size may varied from block to block with some input blocks bigger and some are smaller in a given frame.

Figure 16:
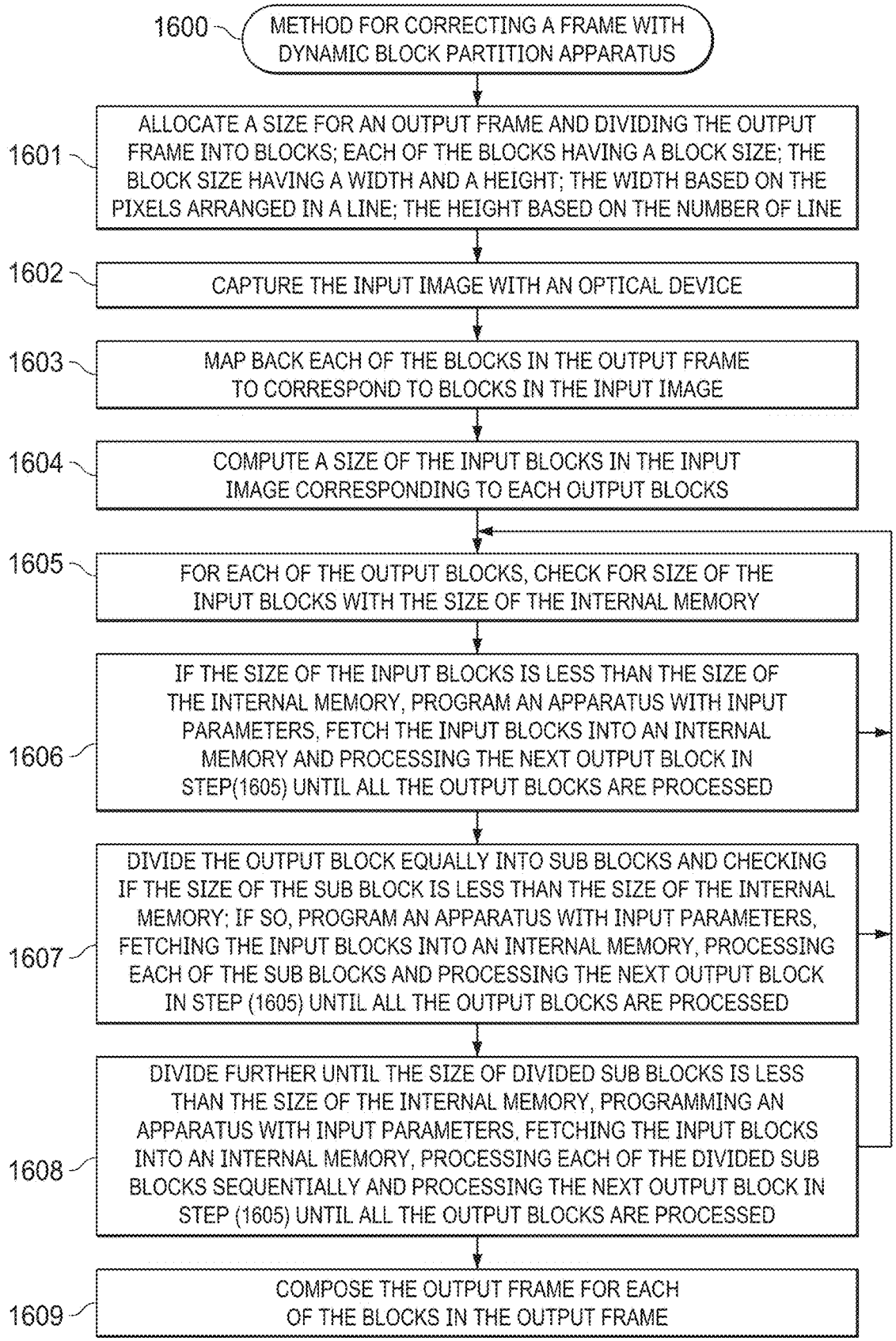
FIG. 16 is an exemplary flowchart of a method for dynamically dividing an output block in an output frame to fit and fetch into an internal memory according to one aspect of the present invention.

As generally seen in the flow chart of FIG. 16 (1600), a preferred exemplary method for geometric correction of an input frame with an dynamic partition apparatus (0800) to generate an output frame may be generally described in terms of the following steps:
1. allocating an output frame with an output frame size and dividing the output frame into output blocks; each of the output blocks having an output block size; the output block size having a width and a height; the width based on the pixels arranged in a line; the height based on the number of lines (1601);
2. capturing an input image with an optical device (1602);
3. mapping back each of the output blocks in the output frame to input blocks in the input image (1603);
4. computing a size of the input blocks in the input image corresponding to each output blocks (1604);
    Input block computation may happens in the following sequence of processing. For each output block following steps are done in sequence.
    1. Calculate input block.
    2. Fetch input block (assuming the size fits in internal memory).
    3. Processing of the pixels and write out.
    The aforementioned steps (1-3) are performed in sequence of each output block
5. for each of the output blocks, checking for size of the input blocks with the size of the internal memory (1605);
6. if the size of the input blocks is less than the size of the internal memory, programming an apparatus with input parameters, fetching the input blocks into an internal memory and processing the next output block in step (1605) until all the output blocks are processed and proceeding to step (1609); if not, proceeding to step (1605) (1606);
    For example, if the size of the input block is 640×20 and the size of the internal memory is 12800 bytes, then the input block is completely fetched in one fetch transaction or cycle or else step (1607) may be executed.
7. dividing the output block equally into sub blocks and checking if the size of the sub block is less than the size of the internal memory; if so, programming an apparatus with input parameters, fetching the input blocks into an internal memory, processing each of the sub blocks and processing the next output block in step (1605) until all the output blocks are processed and proceeding to step (1609); if not proceeding to step (1608) (1607);
    For example, if the size of the input block is 640×20 and the size of the internal memory is 6400 bytes, then the input block is divided into sub blocks. The size of the sub block is less than or equal to the size of the internal memory, the sub blocks are each fetched into the internal memory and processed sequentially to generate an output block.
8. dividing further until the size of divided sub blocks is less than the size of the internal memory, programming an apparatus with input parameters, fetching the input blocks into an internal memory, processing each of the divided sub blocks sequentially and processing the next output block in step (1605) until all the output blocks are processed (1608); and
9. composing the output frame for each of the blocks in the output frame (1609).

System Summary

The present system may be broadly generalized as an apparatus comprising:

a) a capture block configured to capture an arbitrary shaped input images with a plurality of optical devices;
b) an image processing module configured to process each of the images captured with the plurality of optical devices;
c) an identifying module configured to identify redundant blocks and valid blocks in each of the images;
d) an allocating module configured to allocate an output frame with an output frame size and dividing the output frame into regions shaped as a rectangle;
e) a programming module configured to program and disable processing for invalid blocks in each of the regions;
f) a buffer module configured to fetch data corresponding to each of the valid blocks and store in an internal memory; and
g) an interpolation module configured to interpolate data received from the buffer module;
wherein
the interpolated data for each of the regions with the valid blocks is stitched, composed, and displayed on a display module.

This general system summary may be augmented by the various elements described herein to produce a wide variety of invention embodiments consistent with this overall design description.

Method Summary

The present method may be broadly generalized as a method for processing an input frame with an arbitrary shaped processing apparatus and generating an output frame with an arbitrary shape, said method comprising the steps of wherein:
the method comprising the steps of:
    a) capturing arbitrary shaped input images with a plurality of optical devices;
    b) processing each of the images captured with the plurality of optical devices;
    c) identifying redundant blocks and valid blocks in each of the images;
    d) allocating an output frame with an output frame size and dividing the output frame into regions shaped as a rectangle;
    e) programming the apparatus and disabling processing for invalid blocks in each of the regions; and
    f) composing the output frame for each of the regions containing the valid blocks.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

Embodiments of the present invention anticipates wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:

An embodiment wherein the optical devices are selected from a group consisting of: wide angle lens, fish eye lens, and automotive camera lens.

An embodiment wherein the step of capturing the input image further comprises storing the input image in an external memory.

An embodiment wherein the step of identifying redundant blocks further comprises comparing data within the arbitrary shaped input image from each of the optical devices and identifying blocks with duplicate data in adjacent regions.

An embodiment wherein the step of identifying valid blocks further comprises comparing data within the arbitrary shaped input image from each of the optical devices and identifying the blocks with dissimilar data in adjacent regions.

An embodiment wherein the step of programming the apparatus further comprises voiding the coordinates for each of the redundant blocks to process a block within a region.

An embodiment wherein the step of programming the apparatus further comprises automatic computation of input coordinates of input blocks to be fetched corresponding to each of the output blocks.

An embodiment wherein the input coordinates comprise the four corners of a block in the input frame after perspective transform of the output coordinates and back mapping.

An embodiment wherein the step (e) of programming the apparatus further comprises providing the input parameters to the apparatus, the input parameters comprising: output frame width and output frame height, region width and region height; output block width and output block height within a region and each region enable/disable control.

An embodiment wherein the output frame is processed in a raster scan mode within each block in a region and within each region while skipping regions that are disabled.

One skilled in the art will recognize that other embodiments are possible based on combinations of elements taught within the above invention description.

We claim:

1. A method comprising:
capturing, by a first optical device, a first image;
capturing, by a second optical device, a second image;
mapping, by a processor, blocks of an output frame to the first and second images;
determining, by the processor, scaling data for each of the blocks of the output frame;
determining, by the processor, at least one scaling threshold based on the scaling data;
dividing, by the processor, the output frame into one or more regions based on the at least one scaling threshold; and
determining, by the processor, a respective block size for each of the one or more regions of the output frame based on the scaling data and the at least one scaling threshold.

2. The method of claim 1, wherein:
the first optical device includes one of a first wide angle lens, a first fish eye lens, or a first automotive camera lens; and
the second optical device includes one of a second wide angle lens, a second fish eye lens, or a second automotive camera lens.

3. The method of claim 1, wherein:
the first image and the second image have an arbitrary shape; and
the arbitrary shape is square, rectangle, oval, or elongated.

4. The method of claim 1, wherein:
the processor stores the first image and the second image in external memory.

5. The method of claim 1, further comprising:
identifying, by the processor, a block of at least one of the one or more regions as a redundant block; and
skipping, by the processor, some processing of the at least one region that includes the redundant block.

6. The method of claim 5, wherein:
identifying a block of at least one of the one or more regions as a redundant block further comprises comparing data of the first image and data of the second image and identifying that the block is mapped to duplicate data between the first and second images.

7. The method of claim 1, wherein:
the output frame has an output frame size.

8. The method of claim 1, wherein:
the one or more regions of the output frame are rectangular.

9. The method of claim 1, further comprising:
applying, by the processor, a perspective transformation to determine coordinates of blocks in the first and second images corresponding to the blocks of the output frame.

10. The method of claim 1, wherein:
the output frame includes a first region and a second region;
the block size of the first region includes a first block width and a first block height; and
the block size of the second region includes a second block width and a second block height.

11. An apparatus comprising:
a first optical device configured to capture a first image;
a second optical device configured to capture a second image; and
a processor configured to:
map blocks of an output frame to the first and second images;
determine scaling data for each of the blocks of the output frame;
determine at least one scaling threshold based on the scaling data;
divide the output frame into one or more regions based on the at least one scaling threshold; and
determine a respective block size for each of the one or more regions of the output frame based on the scaling data and the at least one scaling threshold.

12. The apparatus of claim 11, wherein:
the first optical device includes one of a first wide angle lens, a first fish eye lens, or a first automotive camera lens; and
the second optical device includes one of a second wide angle lens, a second fish eye lens, or a second automotive camera lens.

13. The apparatus of claim 11, wherein:
the first image and the second image have an arbitrary shape; and
the arbitrary shape is square, rectangle, oval, or elongated.

14. The apparatus of claim 11, wherein:
the processor stores the first image and the second image in external memory.

15. The apparatus of claim 11, wherein the processor is further configured to:

identify a block of at least one of the one or more regions as a redundant block; and skip some processing of the at least one region that includes the redundant block.

16. The apparatus of claim 15, wherein:

to identify a block of at least one of the one or more regions as a redundant block, the processor is configured to compare data of the first image and data of the second image and identify that the block is mapped to duplicate data between the first and second images.

17. The apparatus of claim 11, wherein:

the output frame has an output frame size.

18. The apparatus of claim 11, wherein:

the one or more regions of the output frame are rectangular.

19. The apparatus of claim 11, wherein:

the processor is configured to apply a perspective transformation to determine coordinates of blocks in the first and second images corresponding to the blocks of the output frame.

20. The apparatus of claim 11, wherein:

the output frame includes a first region and a second region;

the block size of the first region includes a first block width and a first block height; and the block size of the second region includes a second block width and a second block height.

* * * * *